(12) United States Patent
Boucké

(10) Patent No.: US 12,215,506 B2
(45) Date of Patent: *Feb. 4, 2025

(54) DECORATIVE PANEL, AND DECORATIVE FLOOR COVERING CONSISTING OF SAID PANELS

(71) Applicant: I4F Licensing NV, Turnhout (BE)

(72) Inventor: Eddy Alberic Boucké, Menen (BE)

(73) Assignee: i4F Licensing NV, Turnhout (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,074

(22) Filed: Mar. 1, 2023

(65) Prior Publication Data
US 2023/0203823 A1 Jun. 29, 2023

Related U.S. Application Data

(63) Continuation of application No. 17/299,126, filed as application No. PCT/EP2019/076450 on Sep. 30, 2019, now Pat. No. 11,624,193.

(30) Foreign Application Priority Data

Dec. 3, 2018 (NL) ..................................... 2022114

(51) Int. Cl.
*E04F 15/10* (2006.01)
*B32B 3/06* (2006.01)
(Continued)

(52) U.S. Cl.
CPC .............. *E04F 15/107* (2013.01); *B32B 3/06* (2013.01); *B32B 7/12* (2013.01); *B32B 9/02* (2013.01);
(Continued)

(58) Field of Classification Search
CPC . E04F 15/107; E04F 15/02038; E04F 15/102; E04F 15/105; C04B 16/02; C04B 18/26; C04B 28/32; C04B 2111/00612
(Continued)

(56) References Cited

U.S. PATENT DOCUMENTS 2,712,512 A * 7/1955 Biefeld ................... C04B 28/30
442/256
3,816,147 A 6/1974 Vassilevsky
(Continued)

FOREIGN PATENT DOCUMENTS

DE 102012000468 A1 7/2013
JP S58130150 A 8/1983
(Continued)

OTHER PUBLICATIONS

Guosheng et al., "Civil Engineering Materials", 2018, p. 29, 2nd edition, Metallurgical Industry Press.
(Continued)

*Primary Examiner* — Brent W Herring
(74) *Attorney, Agent, or Firm* — The Webb Law Firm

(57) ABSTRACT

In the field of decorative floor coverings, decorative panels are known having a MDF (Medium Density Board) or HDF (High Density Board) based core layer on top of which a decorative substrate is attached to provide the panels a desired appearance. The invention relates to a panel, in particular a decorative panel, a floor panel, a ceiling panel or a wall panel. The invention also relates to a floor covering consisting of a plurality of mutually coupled panels.

20 Claims, 13 Drawing Sheets

(51) Int. Cl.

| | |
|---|---|
| *B32B 7/12* | (2006.01) |
| *B32B 9/02* | (2006.01) |
| *B32B 13/14* | (2006.01) |
| *B32B 27/40* | (2006.01) |
| *C04B 16/02* | (2006.01) |
| *C04B 18/24* | (2006.01) |
| *C04B 18/26* | (2006.01) |
| *C04B 28/10* | (2006.01) |
| *C04B 28/30* | (2006.01) |
| *C04B 28/32* | (2006.01) |
| *C04B 28/34* | (2006.01) |
| *E04F 15/02* | (2006.01) |
| *C04B 111/00* | (2006.01) |

(52) U.S. Cl.
CPC ............. *B32B 13/14* (2013.01); *B32B 27/40* (2013.01); *C04B 16/02* (2013.01); *C04B 18/248* (2013.01); *C04B 18/26* (2013.01); *C04B 28/105* (2013.01); *C04B 28/30* (2013.01); *C04B 28/32* (2013.01); *C04B 28/34* (2013.01); *E04F 15/02038* (2013.01); *E04F 15/102* (2013.01); *E04F 15/105* (2013.01); *B32B 2262/065* (2013.01); *B32B 2262/101* (2013.01); *B32B 2264/065* (2013.01); *B32B 2264/067* (2013.01); *B32B 2266/0228* (2013.01); *B32B 2307/3065* (2013.01); *C04B 2111/00612* (2013.01)

(58) Field of Classification Search
USPC .......................................................... 428/703
See application file for complete search history.

(56) References Cited

U.S. PATENT DOCUMENTS

| | | | |
|---|---|---|---|
| 5,030,502 A * | 7/1991 | Teare | B32B 27/30 |
| | | | 428/192 |
| 6,260,326 B1 | 7/2001 | Muller-Hartburg | |
| 6,290,769 B1 * | 9/2001 | Carkner | C04B 28/14 |
| | | | 106/680 |
| 2005/0028474 A1 * | 2/2005 | Kim | E04F 15/04 |
| | | | 52/578 |
| 2005/0210810 A1 * | 9/2005 | Pervan | E04F 15/02038 |
| | | | 52/578 |
| 2011/0167744 A1 * | 7/2011 | Whispell | B32B 5/024 |
| | | | 52/309.1 |
| 2012/0148806 A1 | 6/2012 | Dubey et al. | |
| 2013/0295378 A1 | 11/2013 | Bonin et al. | |
| 2013/0309441 A1 * | 11/2013 | Hannig | F16B 5/008 |
| | | | 29/428 |
| 2015/0114552 A1 * | 4/2015 | Cernohous | C08K 3/36 |
| | | | 264/483 |
| 2015/0337545 A1 | 11/2015 | Granados Pelaez et al. | |
| 2017/0241136 A1 * | 8/2017 | Kell | E04F 15/02033 |
| 2017/0328072 A1 * | 11/2017 | Hannig | E04F 15/02038 |
| 2018/0030737 A1 * | 2/2018 | Pervan | B26D 3/065 |
| 2019/0211569 A1 * | 7/2019 | Boo | E04F 15/107 |
| 2020/0123788 A1 * | 4/2020 | Baert | B32B 7/02 |
| 2020/0208398 A1 * | 7/2020 | Stav | B32B 13/08 |

FOREIGN PATENT DOCUMENTS

| | | | | |
|---|---|---|---|---|
| JP | S62223052 A | 10/1987 | | |
| WO | 2012061300 A2 | 5/2012 | | |
| WO | WO-2017187298 A2 * | 11/2017 | ........ | E04F 15/02038 |
| WO | 2020114645 A1 | 6/2020 | | |

OTHER PUBLICATIONS

Yamei et al., "Civil Engineering Materials", 2013, pp. 68-69, 4th edition, Southeast University Press.

* cited by examiner

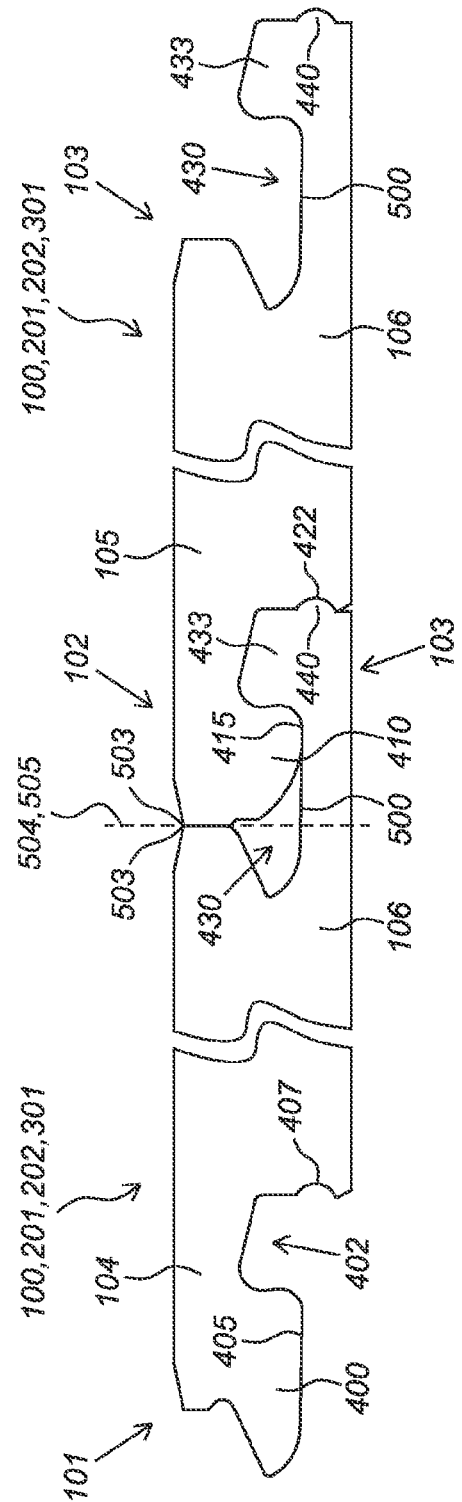

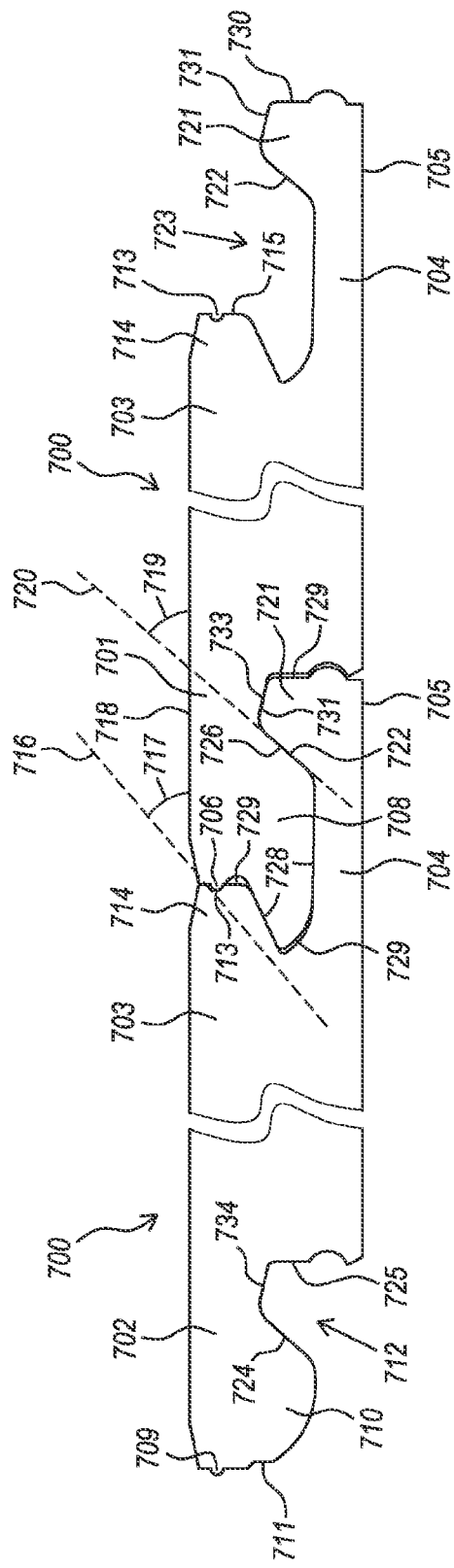
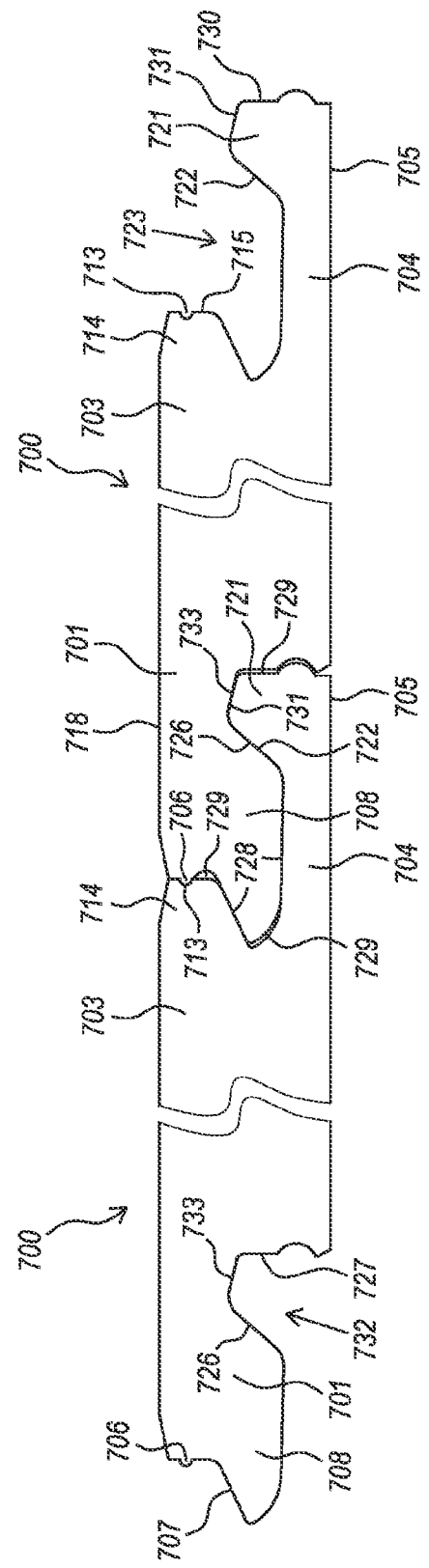
Fig. 7a
Fig. 7b

DECORATIVE PANEL, AND DECORATIVE FLOOR COVERING CONSISTING OF SAID PANELS

CROSS-REFERENCE TO RELATED APPLICATIONS

This application is a continuation application claiming priority to U.S. patent application Ser. No. 17/299,126, filed Jun. 2, 2021, which is the United States national phase of International Application No. PCT/EP2019/076450 filed Sep. 30, 2019, and claims priority to The Netherlands Patent Application No. 2022114 filed Dec. 3, 2018, the disclosures of which are hereby incorporated by reference in their entirety.

BACKGROUND OF THE INVENTION

Field of the Invention

The invention relates to a panel, in particular a decorative panel, a floor panel, a ceiling panel or a wall panel. The invention also relates to a floor covering consisting of a plurality of mutually coupled panels.

Description of Related Art

In the field of decorative floor coverings, decorative panels are known having a MDF (Medium Density Board) or HDF (High Density Board) based core layer on top of which a decorative substrate is attached to provide the panels a desired appearance. A major disadvantage of these known panels is the hygroscopic nature of the core layer, which affects the lifetime and durability of such panels. For this reason, the traditional MDF/HDF based panels are more and more replaced by polyvinyl chloride (PVC) based panels, also provided with a decorative substrate on top. These PVC based panels have the advantage over of being relatively waterproof compared to MDF/HDF based panels. The drawback, however, of these PVC based panels is that the temperature resistance is very poor, as a result of which these panels will typically easily deform (curve) in case these panels are exposed to a heating source, like a heating radiator or even a lamp. Moreover, a common additional important drawback of both the MDF/HDF based panels and the PVC based panels is the flammability of these panels. Flammability of furniture is of concern as, for example, cigarettes and candle accidents can easily trigger domestic fires. Hence, there is a general need in the field of decorative flooring to further develop decorative panels to counteract at least one of the above drawbacks, and in particular to develop a decorative panel which is relatively fireproof. There is an additional need to develop a decorative panel having an improved dimensional stability when subjected to temperature fluctuations during regular use.

SUMMARY OF THE INVENTION

It is an objective of the invention to meet at least one of the needs addressed above.

The above objective of the invention, is met by the provision of a panel, in particular a decorative panel, according to the above preamble, comprising: a core provided with an upper side and a lower side, a decorative top structure affixed on said upper side of the core, a first panel edge comprising a first coupling profile, and a second panel edge comprising a second coupling profile being designed to engage interlockingly with said first coupling profile of an adjacent panel, both in horizontal direction and in vertical direction, wherein said core comprises: at least one composite layer comprising: at least one magnesium oxide (magnesia) and/or magnesium hydroxide based composition, in particular a magnesia cement; particles, in particular cellulose based particles, dispersed in said magnesia cement; and, preferably, at least one reinforcement layer embedded in said composite layer. It has been found that the application of a magnesium oxide and/or magnesium hydroxide based composition, and in particular a magnesia cement, significantly improves the inflammability (incombustibility) of the decorative panel as such. Moreover, the relatively fireproof panel according to the invention also has a significantly improved dimensional stability when subject to temperature fluctuations during normal use. Magnesia based cement is cement which is based upon magnesia (magnesium oxide), wherein cement is the reaction product of a chemical reaction wherein magnesium oxide has acted as one of the reactants. In the magnesia cement, magnesia may still be present and/or has undergone chemical reaction wherein another chemical bonding is formed, as will be elucidated below in more detail. Additional advantages of magnesia cement, also compared to other cement types, are presented below. A first additional advantage is that magnesia cement can be manufactured in a relatively energetically efficient, and hence cost efficient, manner. Moreover, magnesia cement has a relatively large compressive and tension strength. Another advantage of magnesia cement is that this cement has a natural affinity for—typically inexpensive—cellulose materials, such as plant fibres wood powder (wood dust) and/or wood chips; This not only improves the binding of the magnesia cement, but also leads a weight saving and more sound insulation (damping). Magnesium oxide when combined with cellulose, and optionally clay, creates magnesia cements that breathes water vapour; this cement does not deteriorate (rot) because this cement expel moisture in an efficient manner. Moreover, magnesia cement is a relatively good insulating material, both thermally and electrically, which makes the panel according to the invention in particularly suitable for flooring for radar stations and hospital operating rooms. An additional advantage of magnesia cement is that it has a relatively low pH compared to other cement types, which all allows major durability of glass fibre either as dispersed particles in cement matrix and/or (as fiberglass) as reinforcement layer, and, moreover, enables the use other kind of fibres in a durable manner. Moreover, an additional advantage of the decorative panel is that it is suitable both for indoor and outdoor use.

As already addressed, the magnesia cement is based upon magnesium oxide and/or magnesium hydroxide. The magnesia cement as such may be free of magnesium oxide, dependent on the further reactants used to produce the magnesia cement. Here, it is, for example, well imaginable that magnesia as reactant is converted into magnesium hydroxide during the production process of the magnesia cement. Hence, the magnesia cement as such may comprise magnesium hydroxide. Typically, the magnesia cement comprises water, in particular hydrated water. Water is used as normally binder to create a strong and coherent cement matrix.

In an embodiment of a pane according to the invention, the magnesia based composition, in particular the magnesia cement, comprises magnesium chloride ($MgCl_2$). Typically, when magnesia (MgO) is mixed with magnesium chloride in an aqueous solution, a magnesia cement will be formed which comprises magnesium oxychloride (MOC). The bonding phases are $Mg(OH)_2$, $5Mg(OH)_2 \cdot MgCl_2 \cdot 8H_2O$ (5-form), $3Mg(OH)_2 \cdot MgCl_2 \cdot 8H_2O$ (3-form), and $Mg_2(OH)ClCO_3 \cdot 3H_2O$. The 5-form is the preferred phase, since this phase has superior mechanical properties. Related to other cement types, like Portland cement, MOC has superior properties. MOC does not need wet curing, has high fire resistance, low thermal conductivity, good resistance to abrasion. MOC cement can be used with different aggregates (additives) and fibres with good adherence resistance. It also can receive different kinds of surface treatments.

MOC develops high compressive strength within 48 hours (e.g. 8,000-10,000 psi). Compressive strength gain occurs early during curing—48-hour strength will be at least 80% of ultimate strength. The compressive strength of MOC is preferably situated in between 40 and 100 N/mm2. The flexural tensile strength is preferably 10-17 N/mm2. The surface hardness of MOC is preferably 50-250 N/mm2. The E-Modulus is preferably $1-3 \cdot 10^4$ N/mm$^2$. Flexural strength of MOC is relatively low but can be significantly improved by the addition of fibres, in particular cellulose based fibres. MOC is compatible with a wide variety of plastic fibres, mineral fibres (such as basalt fibres) and organic fibres such as bagasse, wood fibres, and hemp. MOC used in the panel according to the invention may be enriched by one or more of these fibre types. MOC is non-shrinking, abrasion and acceptably wear resistant, impact, indentation and scratch resistant. MOC is resistible to heat and freeze-thaw cycles and does not require air entrainment to improve durability. MOC has, moreover, excellent thermal conductivity, low electrical conductivity, and excellent bonding to a variety of substrates and additives, and has acceptable fire resistance properties. MOC is less preferred in case the panel is to be exposed to relatively extreme weather conditions (temperature and humidity), which affect both setting properties but also the magnesium oxychloride phase development. Over a period of time, atmospheric carbon dioxide will react with magnesium oxychloride to form a surface layer of $Mg_2(OH)ClCO_3 \cdot 3H_2O$. This layer serves to slow the leaching process. Eventually additional leaching results in the formation of hydromagnesite, $4MgO \cdot 3CO_3 \cdot 4H_2O$, which is insoluble and enables the cement to maintain structural integrity.

In a preferred embodiment of the panel according to the invention, the magnesium based composition, and in particular the magnesia cement, is based upon magnesium sulphate, in particular heptahydrate sulphate mineral epsomite ($MgSO_4 \cdot 7H_2O$). This latter salt is also known as Epsom salt. In aqueous solution MgO reacts with MgSO4, which leads to magnesium oxysulfate cement (MOS), which has very good binding properties. In MOS, $5Mg(OH)_2 \cdot MgSO4 \cdot 8H_2O$ is the most commonly found chemical phase. Although MOS is not as strong as MOC, MOS is better suited for fire resistive uses, since MOS start to decompose at temperatures more than two times higher than MOC giving longer fire protection. Moreover, their products of decomposition at elevated temperatures are less noxious (sulfur dioxide) than those of oxychloride (hydrochloric acid) and, in addition, less corrosive. Furthermore, weather conditions (humidity, temperature, and wind) during application are not as critical with MOS as with MOC. The mechanical strength of MOS cement depends mainly on the type and relative content of the crystal phases in the cement. It has been found that four basic magnesium salts that can contribute to the mechanical strength of MOS cement exist in the ternary system $MgO$—$MgSO_4$—$H_2O$ at different temperatures between of 30 and 120 degrees Celsius $5Mg(OH)_2 \cdot MgSO_4 \cdot 3H_2O$ (513 phase), $3Mg(OH)_2 \cdot MgSO_4 \cdot 8H_2O$ (318 phase), $Mg(OH)_2 \cdot 2MgSO_4 \cdot 3H_2O$ (123 phase), and $Mg(OH)_2 \cdot MgSO_4 \cdot 5H_2O$ (115 phase). Normally, the 513 phase and 318 phase could only be obtained by curing cement under saturated steam condition when the molar ratio of MgO and MgSO4 was fixed at (approximately) 5:1. It has been found that the 318 phase is significantly contributing to the mechanical strength and is stable at room temperature, and is therefore preferred to be present in the MOS applied. This also applies to the 513 phase. The 513 phase typically has a (micro)structure comprising a needle-like structure. This can be verified by means of SEM analysis. The magnesium oxysulfate ($5Mg(OH)_2 \cdot MgSO4 \cdot 3H_2O$) needles may be formed substantially uniform, and will typically have a length of 10-15 µm and a diameter of 0.4-1.0 µm. When it is referred to a needle-like structure, also a flaky-structure and/or a whisker-structure can be meant. In practice, it does not seem feasible to obtain MOS comprising more than 50% 513 or 318 phase, but by adjusting the crystal phase composition can be applied to improve the mechanical strength of MOS. Preferably, the magnesia cement comprises at least 10%, preferably at least 20% and more preferably at least 30% of the $5Mg(OH)_2 \cdot MgSO_4 \cdot 3H_2O$ (513-phase). This preferred embodiment will provide a magnesia cement having sufficient mechanical strength for use in the core layer of a floor panel.

The crystal phase of MOS is adjustable by modifying the MOS by using an organic acid, preferably citric acid and/or by phosphoric acid and/or phosphates. During this modification new MOS phases can obtained, which can be expressed by $5Mg(OH)2 \cdot MgSO4 \cdot 5H_2O$ (515 phase) and $Mg(OH)_2 \cdot MgSO_4 \cdot 7H_2O$ (517-phase). The 515 phase is obtainable by modification of the MOS by using citric acid. The 517 phase is obtainable by modification of the MOS by using phosphoric acid and/or phosphates ($H_3PO_4$, $KH_2PO_4$, $K_3PO_4$ and $K_2HPO_4$). These 515 phase and 517 phase can be determined by chemical element analysis, wherein SEM analysis proves that the microstructure both of the 515 phase and the 517 phase is a needle-like crystal, being insoluble in water. In particular, the compressive strength and water resistance of MOS can be improved by the additions of citric acid. Hence, it is preferred that MOS, if applied in the panel according to the invention, comprises $5Mg(OH)2 \cdot MgSO4 \cdot 5H2O$ (515 phase) and/or $Mg(OH)_2 \cdot MgSO_4 \cdot 7H_2O$ (517-phase). As addressed above, adding phosphoric acid and phosphates can extend the setting time and improve the compressive strength and water resistance of MOS cement by changing the hydration process of MgO and the phase composition. Here, phosphoric acid or phosphates ionize in solution to form $H_2PO_4^-$, $HPO_4^{2-}$, and/or $PO_4^{3-}$, wherein these anions adsorb onto $[Mg(OH)(H_2O)^x]^+$ to inhibit the formation of $Mg(OH)_2$ and further promote the generation of a new magnesium subsulfate phase, leading to the compact structure, high mechanical strength and good water resistance of MOS cement. The improvement produced by adding phosphoric acid or phosphates to MOS cement follows the order of $H_3PO_4 = KH_2PO_4 >> K_2HPO_4 >> K_3PO_4$. MOS has better volumetric stability, less shrinkage, better binding properties and lower corrosivity under a significantly wider range of weather conditions than MOC, and could therefore be preferred over MOS. The density of MOS typically varies from 350 to 650 kg/m3. The flexural tensile strength is preferably 1-7 N/mm2.

In another preferred embodiment, the magnesium based composition, in particular the magnesia cement, comprises magnesium phosphate cement (MPC). Preferred MPCs are magnesium ammonium phosphate cement (MAPC) and magnesium potassium phosphate cement (MKPC). MAPC results from a chemical reaction between magnesium oxide with a soluble phosphate, such as ammonium phosphate ($NH_4H_2PO_4$), also referred to as ADP, either the mono or dibasic salt. Alternatively an agricultural fertilizer solution known as 10-34-0 (NPK designation) can also be used. MAPC has fast setting and very high early strength. It has very good adhesion to a wide variety of compatible aggregates (additives). A wide variety of insoluble ammonium and magnesium phosphate phases are formed, but struvite ($NH_4MgPO_4·6H_2O$) and dittmarite ($NH_4MgPO_4·H_2O$) are believed to be the main phases. The ratio of these phases is dictated by the speed of reaction, with dittmarite being predominant at a fast rate and struvite being predominate at a slower rate. • At temperatures above 55° C., struvite decomposes releasing water and ammonia from its structure. The resulting material has an amorphous structure that corresponds chemically to $MgHPO_4$. ADP is added in excess to ensure full reaction and provide higher compressive strength in the hardened concrete resulting in the excess ADP being volatilized during curing. MKPC is formed by reaction of MgO with monopotassium phosphate ($KH_2PO_4$), referred to as MKP. The final reaction product is identified as magnesium potassium phosphate hexahydrate (MgKPO4·6H2O). Various intermediate phases are formed during the reaction as the pH and temperature vary during the reaction. Both increasing the molar ratio of magnesium to phosphate (M/P) and decreasing the weight ratio of liquid to solid can accelerate the reaction rate. Due to a very fast rate of reaction, the MgO normally used is dead-burned, both in MAPC and in MKPC. Retarders, normally borates, are preferably used during the formation of both MAPC and MKPC to achieve a manageable reaction time. MPC develops a high compressive strength within the range of 5,000-10,000 psi (35-70 MPa). MPC does not lose strength over time under normal exposure conditions. A number of factors may affect strength development, with the largest effect observed being the ratios of reactants (M/P), w/b ratio, amount of retarders used, and materials added as fillers/aggregates to the binder. Flexural strengths of 600-2,000 psi (4-14 MPa) were found with little effect on strength due to reactant ratios. Preferably, fibers, such as cellulose based fibers, in particular wood fibers and/or hemp fibers, are added to the MPC, since this will improve flexural strength. Use of additives and fibers have resulted in formulations useful for flexural strengthening of the magnesia cement utilizing at least one glass mesh. MPC, and in particular MKP, exhibit minimal shrinkage, excellent freeze-thaw resistance, and very low permeability. It also has low coefficient of thermal expansion, relatively good corrosion protection, and relatively high abrasive resistance. Immersion in magnesium sulfate solution is preferably done to increase the strength of the MPC formed.

As mentioned above, the addition of citric acid and/or a derivate thereof, in particular citrate is preferred since this will improve the panel strength. The composite layer may for example comprise and/or is at least partially formed by using up to 0.5% by weight of citric acid. It is however also conceivable that the composite later comprises up to 1% by weight of citric acid, and possibly up to 2% by weight. Typically, the composite layer comprises at least 0.1% by weight of citric acid, and preferably at least 0.2% by weight. The same applies to the addition of sodium silicate, and in particular in case the combination of citrate and sodium silicate in 1:1 proportions is applied. In this latter case, the flexural strength can even be doubled. Addition of sodium bicarbonate significantly improved water resistance of magnesia cements, and is therefore also preferred. The addition of dolomite, magnesite or other fillers at a level of 40-60% of binder can absorb some of the heat and reduce the chances for thermal cracking of the magnesia cement formed, and may therefore also advantageously be applied.

The composite layer preferably comprises at least one mineralizer selected from the group consisting of: sodium hydroxide (NaOH), calcium chloride ($CaCl_2$), aluminium sulphate ($Al_2(SO_4)_3$), and calcium hydroxide $Ca(OH)_2$. As addressed above, the panel according to the invention typically comprises cellulose based particles, in particular lignocellulose based particles. Preferably, the cellulose based particles comprise wood and/or hemp. Previous research shows that wood and hemp are chemically heterogeneous and its components can be divided into two groups: structural components of high molecular weight-natural polymer substances (cellulose, hemicelluloses and lignin) which are the major cell wall components, and non-structural components of low molecular weight (extractives and inorganic components). Both wood and wood fibres comprise many chemical components, but it was found that the main inhibitor of cement hydration is sugar. Several chemical treatments are preferably to the natural fibres, such as wood fibres or hemp fibres, before mixing them with the (initially fluid) magnesia cement. The compressive strength and other mechanical properties of the treated wood fibre composites are higher than those of the untreated fibres. Chemicals such as sodium hydroxide (NaOH), calcium chloride ($CaCl_2$), and aluminium sulphate ($Al_2(SO_4)_3$), sometimes also referred to as mineralization agents (mineralizers), typically improves compatibility of cement and plant origin aggregates. Complex mineralizers such as $Al_2(SO_4)_3+Ca(OH)_2$ may also be applied. When $Al_2(SO_4)_3$ is used as a mineralizer, it impedes the release of sugar from organic aggregates and reduces hygroscopicity and water absorption. $Al_2(SO_4)_3$ in the form of hydrate is the characteristic of an acidic reaction in water, and calcium hydroxide [$Ca(OH)_2$] is characteristic of an alkaline reaction in water. The mineralization is achieved by enhancing the efficiency of $Al_2(SO_4)_3$, at least partially neutralizing the acidic environment caused by $Al_2(SO_4)_3$ and improving the workability of the mixture. Wood aggregate mineralization also leads to improved adhesion between the wood particles and the magnesia cement, as a result of which are more stable, coherent magnesia cement can be realized.

As mentioned above, at least a part of the cellulose based particles is formed by fibres. It is also imaginable that at least a part of the cellulose based particles is formed by powder, (wood) shavings, (wood) wool, and/or (wood) chips. Instead of wood, also other natural fibres may be used, such as hemp. Hemp enriched magnesia cement also exhibit a relatively good thermal insulation material, excellent hydric properties, great acoustic capabilities, and good fire resistance. Here, typically hemp shiv is used as coarse aggregate (basic component) Like with wood, the hemp shiv is preferably mineralized by $Al_2(SO_4)_3$, neutralized with $Ca(OH)_2$ and mixed with the (initially fluid/liquid) magnesia cement.

The composite layer comprises preferably at least one additional filler selected from the group consisting of: steel, glass, polypropylene, wood, acrylic, alumina, curaua, carbon, cellulose, coconut, kevlar, nylon, perlon, polyethylene, PVA, rock wool, sisal, and fique. This may further increase the strength of the panel and/or the water resistivity and/or the fireproof properties of the panel as such.

Preferably, the composite layer comprises sodium carboxymethyl cellulose (CMC). It was found that the addition of CMC to the composite layer (during production) facilitates and even promotes self-degradation of said magnesium based composite layer, in particular a magnesia cement, in an alkaline aqueous environment and at elevated temperature (200° C. or higher). Hence, this will improve the biodegradability of the panel. At this elevated temperature, CMC emitted two major volatile compounds, $CO_2$ and acetic acid, creating a porous structure in cement. CMC also reacted with NaOH from sodium silicate, if applied, to form three water-insensitive solid reaction products, disodium glycolate salt, sodium glucosidic salt, and sodium bicarbonate. Other water-sensitive solid reaction products, such as sodium polysilicate and sodium carbonate, were derived from hydrolysates of sodium silicate. Dissolution of these products upon contact with water generated heat that promoted cement's self-degradation. Thus, CMC, in particular CMS of high molecular weight of MW 30,000, rendered two important features to the water-catalysed self-degradation of heated cement: One was the high heat energy generated in exothermic reactions in cement; the other was the introduction of extensive porosity into cement. Here, it is for example conceivable that the composite layer comprises 50 parts of magnesium oxide, 20 parts of magnesium sulfate solution, 7 parts of coarse wood fibre (or flour), 5 parts of fine wood fibre (or flour), 3 parts of other reinforcing fibres, 3 parts of sodium silicate, 0.3 parts of sodium carboxymethyl cellulose (CMC), and optionally 3 parts of fly ash. Fly ash typically replaces magnesium based ingredients in order to save costs. Fly ash is often a by-product of the power plants and is typically qualified as a pozzolanic material that can be used as a mineral additive for magnesia cement. Fly ash can reduce the heat of cement hydration in the early stage, the shrinkage rate of magnesia cements, and the porosity of cement stone, as well as improve the density of cement stone and the physical and mechanical properties. Fly ash showed to improve rheology of the magnesia cement, though typically at the expense of compressive strength. Consequently, the amount of fly ash in the composite layer, in particular the magnesia layer, is preferably kept limited to an amount equal to or lower than 10% by weight.

Preferably, the composite layer comprises silica fume. Silica fume, also known as microsilica, is an amorphous (non-crystalline) polymorph of silicon dioxide, silica. It is an ultrafine powder collected as a by-product of the silicon and ferrosilicon alloy production and typically consists of spherical particles with an average particle diameter of 150 nm. By incorporation of silica fume in the composite layer, in particular the magnesia cement, the water resistivity as well as the fireproof properties can be improved significantly. The silica fume may affect the compressive strength of the composite layer though, as a result of which the amount of silica fume is preferably kept limited to an amount equal to or lower than 10% by weight.

The composite layer may comprise iron oxide ($Fe_2O_3$), preferably in an amount of less than 6% by weight. Iron oxide imparts colour to cement. Moreover, at a very high temperature, iron oxide chemically reacts with calcium and aluminium, which could also be present in the composite layer, to form tricalcium alumino-ferrite, which material (tricalcium alumino-ferrite) improves hardness and strength of the composite layer. Preferably, the amount of alumina ($Al_2O_3$) in the composite layer is situated in between 3 and 8% by weight. Preferably, the amount of calcium sulfate needed for the aforementioned reaction will typically be between up to (and including) 0.5% by weight.

The composite layer preferably comprises fatty acids. Fatty acids may penetrate through channels (pores) of raw magnesite before grinding, and will facilitate the (efficiency of the) grinding process to produce magnesia based cement powder.

The composite layer may comprise at least one alkali metal sulfate, such as magnesium sulfate. This will commonly accelerate the production process of the composite layer.

Although the one or more composite layers are preferably free of polymers, it is imaginable that one or more composite layers comprise at least one polymer, such as polyvinylchloride (PVC), polystyrene (PS) and/or polyurethane (PUR). PS may be in the form of expanded PS (EPS) in order to further reduce the density of the panel, which leads to a saving of costs and facilitates handling of the panels. Other polymers, in particular thermoplastics may also be used. It is also imaginable that rubber parts (particles) are dispersed within at least one composite layer to improve the flexibility at least to some extent. The at least one polymer, if applied, may be applied within the composite layer in the form of a sheet (closed layer), a mesh (woven), a non-woven, and/or as separate polymer particles (such as fibers, beads, spheres, etc.). In case a polymer layer is applied the layer is preferably enclosed on both sides by composite material and is therefore preferably embedded within said composite layer.

Preferably, the composite layer comprises perlite, preferably expanded (foamed) perlite. Perlite is an amorphous volcanic glass that has a relatively high water content, typically formed by the hydration of obsidian. Perlite has the unusual property of greatly expanding when heated sufficiently, which could significantly reduce the density of the composite layer, and hence of the panel as such. It is preferred that composite layer comprises moreover foamed perlite of different particle size values. Closed cell foamed perlite may lead to the achievement of a porosity (of perlite) of 30-40%. Said perlite can be preliminarily processed by siliconic solutions, sodium, potassium and lithium silicates.

The composite layer may moreover comprise one or more additive materials advantageously including surface active substances (SAS) such as methylcellulose, "Badimol" plasticizing materials and other cation-active SAS's for improving the rheology of the mixture. The composite layer may also comprise bentonite, that is a finely ground natural product, adapted to increase rheology and waterproof characteristics of the panel as such.

The composite layer may also comprise at least one fire-retardant additive. This fire-retardant additive is preferably formed by an organ halogen compound. Such compounds are able to remove reactive H and OH radicals during a fire. The organ halogen compound preferably comprises bromine and/or chlorine. Recommended from a viewpoint of fire retardance over an organochlorine compound such as PCB (polychlorinated biphenyl) is an organ bromine compound such as PBDE (polybrominated diphenyl ether). Other examples of applicable brominated compounds are: Tetrabromobisphenol A, Decabromodiphenyl ether (Deca), Octabromodiphenyl ether, Tetrabromodiphenyl ether, Hexabromocyclododecane (HBCD), Tribromophenol, Bis(tribromophenoxy)ethane, Tetrabromobisphenol A polycarbonate oligomer (TBBA or TBBPA), Tetrabromobisphenol A epoxy oligomer (TBBA or TBBPA), and Tetrabromophthalic acid anhydride. Other examples of applicable chlorinated compounds are: Chlorinated paraffin, Bis(hexachlorocyclopentadieno)cyclooctane, Dodecachloride pentacyclodecane (Dechlorane), and 1,2,3,4,7,8,9,10, 13,13,14,14-dodecachloro-1,4,4a,5,6,6a,7,10,10a,11,12, 12a-dodecahydro-1,4,7,10-dimethanodibenzo[a,e] cyclooctene (Dechlorane Plus). Although halogenated flame retardants are particularly effective, they generally have the drawback that toxic smoke can result in the case of fire. It is therefore also possible to envisage applying one or more alternative, less toxic fire-retardant additives, including intumescent (foaming) substances. The operating principle of these alternative additives is based on formation of a foam layer which functions as oxygen barrier and therefore also has a fire-retardant effect. Such intumescent additives generally comprise melamine or a salt derived therefrom. An example hereof is a mixture of polyphosphates (acid donor) in co-action with a melamine (foaming agent) and a carbon donor such as dipentaerythritol, starch or pentaerythritol. Gaseous products such as carbon dioxide and ammonia gas are formed here in the case of fire. The formed foam layer is stabilized by cross-linking, as in the case of vulcanization. Other examples of applicable, relatively environmentally-friendly, melamine-based additives are: melamine cyanurate, melamine polyphosphate and melamine phosphate.

In order to save weight, and therefore cost, it may be advantageous that the composite layer is at least partially foamed. The foamed structure may comprises open pores (cells) and/or closed pores (cells).

Although the composite layer(s) may be provided with one or more plasticizers, such as phthalates, to provide more flexibility to the composite layer(s) (and to the panel as such), it is preferred that each composite is preferably free of any plasticizer in order to increase the rigidity of the core of the panel, and which is, moreover, also favourable from an environmental point of view.

The at least one reinforcement layer is preferably a non-woven layer or woven layer, in particular a cloth, for example made by fiberglass. They may have a thickness of 0.2-0.4 mm. It is also conceivable that each tile comprises a plurality of the (commonly thinner) base layer stacked on top of each other, wherein at least one reinforcing layer is situated in between two adjacent base layers. Preferably, the density of the reinforcing layer is preferably situated between 1.000 and 2.000 $kg/m^3$, preferably between 1.400- and 1.900 $kg/m^3$, and more preferably between 1.400-1.700 $kg/m^3$. At least one reinforcement layer may comprise natural fibers, such as jute. The reinforcement layer comprising natural fibers, such as but not limited to jute, has might increases the setting time and standard water consistency value of the composite layer. Further, the hydration kinetics of the magnesia cement might decrease when a reinforcement layer comprising natural fibers is embedded in the magnesia cement. This knowledge may be used to control the setting time, or curing time, of the panel. Hence, the use of a reinforcement layer comprising natural fibers can ensure that the hardening of the panel is slowed down, thereby preventing that the drying process will be too fast, resulting in water being evaporated. The latter may cause undesired irregularities in the material, such as cracks. At least one reinforcement layer may comprise synthetic fibers, in particular polymer fibers, such as nylon fibers.

Preferably, the composite layer comprises at least 50% by weight, preferably in between 50 and 90% by weight, of magnesia cement. Preferably, the composite layer comprises in between 1 and 15% by weight of cellulose based fibers. Preferably, the composite layer comprises in between 0 and 3% by weight of perlite. Preferably, the composite layer comprises in between 1 and 8% by weight of reinforcement layer.

In a preferred embodiment, at least one composite layer has a density greater than 1 $kg/m^3$. This relatively high density will commonly lead to strong and rigid panels. It is, however, also imaginable that at least one composite layer has a density lower than 1 $kg/m^3$, which leads to a saving in weight and therefore in transporting and handling costs. The lower density can e.g. be achieved by applying one or more foamed ingredients, such as expanded perlite, expanded polystyrene, etc.

It is imaginable that the core is provided with a waterproof coating substantially covering the at least one composite layer. This may further improve the waterproof properties of the panel as such. To this end, the waterproof coating may be a two-component liquid-applied waterproofing formulation for application as a liquid to at least one (outer surface of at least one) composite layer. Typically, this coating comprises: separate components A and B which are transportable in separate containers and are combinable to form a blend in which vulcanization is initiated solidifying the components into a membrane wherein component A comprises an aqueous latex of a natural or synthetic rubber and component B comprises an oil carrier in which is dispersed a vulcanizing agent operative to cure the rubber in component A, and a hygroscopic agent operative to chemically bind the water in component A. Component A preferably comprises a latex stabilizer operative to increase the working life of the latex by controlling the initial pH of the latex components. It is also discovered that additions of potassium hydroxide (KOH) dissolved in minimal amounts in component A can lengthen the setting time, but excessive amounts may destabilize and cause premature gelation of the latex. A preferred addition rate, therefore, is up to 1.5 parts per 100 parts of rubber. It is believed that other high pH additives, such as ammonia or sodium hydroxide (NaOH) may be used. Accordingly, an exemplary component A of the invention may comprise 0 to 2.5 phr (per hundred parts rubber). Component B contains, among other things, an oil 12 carrier fluid for the vulcanization agent and hygroscopic agent. In preferred embodiments, the oil carrier fluid is a blend of hydrocarbon oils, such as a blend of both aromatic and paraffinic compositions. The aromatic oils which preferentially swell the rubber particles are generally more viscous. Fluidity can be controlled by the addition of paraffinic oils of lower viscosity which also serve to adjust the setting time of the composition. In other exemplary embodiments, synthetic liquid plasticizers such as phthalates, adipates, or other commonly used rubber plasticizers can be used. The carrier fluid 12 may also contain a proportion of bitumen, either oxidized or penetration grade. The level of aromatic oil is not likely to be less than 50% of the oil carrier fluid, and the bitumen not greater than 30%. The presence of the bitumen, however, is not critical to the invention. Also optional is the use of a hard synthetic or natural resin. The oil 12 carrier fluid will comprise 20-60% by total weight of the formulation (when components A and B are combined). Component B typically contains a vulcanization agent or package. Preferably, the vulcanization package comprises elemental sulphur as the sulphur donor for the system, zinc oxide as a vulcanization activator, and a mixture of zinc iso-propyl xanthate (ZIX) and zinc dibutyl dithiocarbamate dibutylamine complex (ZDBCX) as accelerators. These may be used in the preferred ranges, respectively, 0.5 to 15.0 phr (parts sulphur based on parts hundred of rubber), 0.5 to 20.0 phr (ZnO), 0.1 to 5.0 phr (ZIX), and 0.1 to 5.0 phr (ZDBCX). Other known vulcanizing agents and/or packages are believed to be suitable for use in the invention. Component B may also comprise a hygroscopic agent or desiccant for chemically binding the water of component A. The preferred hygroscopic agent is calcium oxide. Other hygroscopic agents may include other metal oxides which react with water to form hydroxides, e.g., magnesium, barium, etc. Hydraulic cements, such as Portland cement, or high alumina cement, calcium sulphate cement (plaster of paris), or magnesium oxychloride cement, may also be used. The hygroscopic agent may also comprise anhydrous salts which absorb significant proportions (25% or more) of their own weight of water, such as borax. The weight of the hygroscopic agent is chosen to effectively dewater the latex, with preferably a slight excess to ensure that the water is bound up. However, it is possible that partial desiccation of the latex may be used, i.e., less than stoichiometric quantities of hygroscopic agent used. The hygroscopic agent, depending upon which is chosen, can comprise 10-50% of the total formulation system. Component B may also comprise one or more rheology modifiers. Preferably, a combination of montmorillonite clay (activated with a chemical activator) and stearate-coated calcium carbonate is used to achieve the desired balance of rheological properties, although other options, such as organo-treated bentonite clays, fumed silica, polymer fibers, ground rubber, pulverized fly ash, hollow glass microspheres, and hydrogenated castor oils, could be employed. The amount of rheology modifiers, depending upon the material chosen, could comprise 0.5 to 25.0% weight total solids in the formulation system (components A and B combined).

It is also conceivable that a waterproof layer is situated in between the core and the top structure. This may further improve the waterproof properties of the panel as such. The waterproof layer may have the same composition as the composition of the waterproof coating described above, but may also be formed by a polymer layer, such as a PVC layer.

It is not unlikely that composite layer comprises a plurality of reinforcement layers. For example, at least one first reinforcement layer may be located in a top portion of the composite layer, and wherein at least one second reinforcement layer may be located in a bottom portion of the composite layer.

It is imaginable that the core comprises a laminate of composite layers, which are either directly and/or indirectly, stacked onto each other. The composite layers may have an identical composition, though may also have mutually different compositions, which allows the properties for each composite layer to be tweaked and to be adapted for its own primary function (e.g. sound-dampening, providing strength, providing flexibility, etc.).

The top structure is preferably adhered onto the core by means of a waterproof adhesive. This makes shields the composite layer(s) from water applied to the top structure, which renders the panel as such more waterproof. Moreover, this prevents that the top structure easily delaminates from the core.

The top structure preferably comprises at least one decorative layer and at least one transparent wear layer covering said decorative layer. A lacquer layer or other protective layer may be applied on top of said wear layer. A finishing layer may be applied in between the decorative layer and the wear layer. The decorative layer will be visible and will be used to provide the panel an attractive appearance. To this end, the decorative layer may have a design pattern, which can, for example be a wood grain design, a mineral grain design that resembles marble, granite or any other natural stone grain, or a colour pattern, colour blend or single colour to name just a few design possibilities. Customized appearances, often realized by digital printing during the panel production process, are also imaginable. The decorative top structure may also be formed by a single layer. The decorative top structure preferably comprises a polymeric film and/or a paper layer. The aforementioned polymeric film and paper layer are typically provided with a decorative print. The aforementioned polymeric film and/or paper layer are directly or indirectly attached to the core, for example by using glue. In an alternative embodiment, the decorative top structure is omitted, thus not applied, in the panel according to the invention. In this latter embodiment, the decorative panel, in particular a floor panel, ceiling panel or wall panel, comprising: a core provided with an upper side and a lower side, a first panel edge comprising a first coupling profile, and a second panel edge comprising a second coupling profile being designed to engage interlockingly with said first coupling profile of an adjacent panel, both in horizontal direction and in vertical direction, wherein said core comprises: at least one composite layer comprising: at least one magnesia cement, cellulose based particles dispersed in said magnesia cement; and at least one reinforcement layer embedded in said composite layer.

Preferably, the panel comprises a backing layer attached to a rear side of the core. The at least one backing layer is preferably at least partially made of a flexible material, preferably an elastomer. The thickness of the backing layer typically varies from about 0.1 to 2.5 mm. Non-limiting examples of materials whereof the backing layer can be made of are polyethylene, cork, polyurethane and ethylene-vinyl acetate. The thickness of a polyethylene backing layer is for example typically 2 mm or smaller. The backing layer commonly provides additional robustness, dimensional stability, and/or impact resistances to the panel as such, which increases the durability of the panel. Moreover, the (flexible) backing layer may increase the acoustic (sound-dampening) properties of the panel. In a particular embodiment, Preferably, at least one reinforcement layer extends in only one coupling profile of the first and second coupling profile. This can be realized by designing the first coupling profile and the second coupling profile in such a way that a vertically extending tongue-groove (fold-down) connection is formed, typically by using an upper profile and a lower profile, a preferred example of which will be given below. The advantage of applying the reinforcing layer in only one coupling profile, typically aforementioned lower profile, and thus not in the complementary coupling profile, typically aforementioned upper profile, is that the flexibility of the one profile (upper profile) is greater than the flexibility of the other profile (lower profile). This typically means that the upper profile is easier to deform than the lower profile, and this is in particular advantageous in case deformation is needed to realize a coupling between the coupling profiles.

Preferably, the first coupling profile comprises:
an upward tongue,
at least one upward flank lying at a distance from the upward tongue,
an upward groove formed in between the upward tongue and the upward flank wherein the upward groove is adapted to receive at least a part of a downward tongue of a second coupling profile of an adjacent panel, and
at least one first locking element, preferably provided at a distant side of the upward tongue facing away from the upward flank, and preferably the (complimentary) second coupling profile comprises:
a first downward tongue,
at least one first downward flank lying at a distance from the downward tongue,
a first downward groove formed in between the downward tongue and the downward flank, wherein the downward groove is adapted to receive at least a part of an upward tongue of a first coupling profile of an adjacent panel, and at least one second locking element adapted for co-action with a first locking element of an adjacent panel, said second locking element preferably being provided at the downward flank.

Preferably, the first locking element comprises a bulge and/or a recess, and wherein the second locking element comprises a bulge and/or a recess. The bulge is commonly adapted to be at least partially received in the recess of an adjacent coupled panel for the purpose of realizing a locked coupling, preferably a vertically locked coupling. It is also conceivable that the first locking element and the second locking are not formed by a bulge-recess combination, but by another combination of co-acting profiled surfaces and/or high-friction contact surfaces. In this latter embodiment, the at least one locking element of the first locking element and second locking element may be formed by a (flat of otherwise shaped) contact surface composed of a, optionally separate, plastic material configured to generate friction with the other locking element of another panel in engaged (coupled) condition. Examples of plastics suitable to generate friction include:

Acetal (POM), being rigid and strong with good creep resistance. It has a low coefficient of friction, remains stable at high temperatures, and offers good resistance to hot water;

Nylon (PA), which absorbs more moisture than most polymers, wherein the impact strength and general energy absorbing qualities actually improve as it absorbs moisture. Nylons also have a low coefficient of friction, good electrical properties, and good chemical resistance;

Polyphthalamide (PPA). This high performance nylon has through improved temperature resistance and lower moisture absorption. It also has good chemical resistance;

Polyetheretherketone (PEEK), being a high temperature thermoplastic with good chemical and flame resistance combined with high strength. PEEK is a favourite in the aerospace industry;

Polyphenylene sulphide (PPS), offering a balance of properties including chemical and high-temperature resistance, flame retardance, flowability, dimensional stability, and good electrical properties;

Polybutylene terephthalate (PBT), which is dimensionally stable and has high heat and chemical resistance with good electrical properties;

Thermoplastic polyimide (TPI) being inherently flame retardant with good physical, chemical, and wear-resistance properties.

Polycarbonate (PC), having good impact strength, high heat resistance, and good dimensional stability. PC also has good electrical properties and is stable in water and mineral or organic acids; and Polyetherimide (PEI), maintaining strength and rigidity at elevated temperatures. It also has good long-term heat resistance, dimensional stability, inherent flame retardance, and resistance to hydrocarbons, alcohols, and halogenated solvents.

It is imaginable that the first coupling profile and the second coupling profile are configured such that in coupled condition a pretension is existing, which forces coupled panels at the respective edges towards each other, wherein this preferably is performed by applying overlapping contours of the first coupling profile and the second coupling profile, in particular overlapping contours of downward tongue and the upward groove and/or overlapping contours of the upward tongue and the downward groove, and wherein the first coupling profile and the second coupling profile are configured such that the two of such panels can be coupled to each other by means of a fold-down movement and/or a vertical movement, such that, in coupled condition, wherein, in coupled condition, at least a part of the downward tongue of the second coupling part is inserted in the upward groove of the first coupling part, such that the downward tongue is clamped by the first coupling part and/or the upward tongue is clamped by the second coupling part.

In a preferred embodiment, the panel comprises at least one third coupling profile and at least one fourth coupling profile located respectively at a third panel edge and a fourth panel edge, wherein the third coupling profile comprises:

a sideward tongue extending in a direction substantially parallel to the upper side of the core, at least one second downward flank lying at a distance from the sideward tongue, and a second downward groove formed between the sideward tongue and the second downward flank, wherein the fourth coupling profile comprises:

a third groove configured for accommodating at least a part of the sideward tongue of the third coupling profile of an adjacent panel, said third groove being defined by an upper lip and a lower lip, wherein said lower lip is provided with an upward locking element, wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

The panel, typically the core, in particular at least one composite layer, preferably comprises recycled material. Recycled material typically relates to reusing left-over material resulting from prior (panel) production processes.

The core preferably has a thickness of at least 3 mm, preferably at least 4 mm, and still more preferably at least 5 mm. The panel thickness is typically situated in between 3 and 10 mm, preferably in between 4 and 8 mm.

The invention also relates to a decorative covering, in particular a decorative floor covering, decorative ceiling covering, or decorative wall covering, comprising a plurality of mutually coupled decorative panels according to the invention. The covering may also be installed at vertical corners, such as at inside corners of intersecting walls, pieces of furniture, and at outside corners, such as at entry ways.

The invention also relates to a decorative panel, in particular a floor panel, ceiling panel or wall panel, comprising a core provided with an upper side and a lower side, a decorative top structure affixed on said upper side of the core, a first panel edge comprising a first coupling profile, and a second panel edge comprising a second coupling profile being designed to engage interlockingly with said first coupling profile of an adjacent panel, both in horizontal direction and in vertical direction, wherein said core comprises at least one composite layer comprising at least one magnesia cement, cellulose based particles dispersed in said magnesia cement; and at least one reinforcement layer embedded in said composite layer, wherein the magnesia cement is based upon magnesium oxide and wherein the composite layer comprises citric acid. In this preferred embodiment, the magnesia cement is based upon magnesium oxide and the composite layer further comprises citric acid. The combination of magnesium oxide and citric acid has a positive effect on the crystal structure, and the formation thereof, of the composite layer. The combination of magnesium oxide and citric acid in particular facilitates the formation of needle-like structures. Therefore, this combination may contribute to an improved compressive strength and water resistance of the composite layer, and thus of the panel as such. Further, the use of citric acid may enhance the volume stability of the composite layer.

The invention is elucidated by means of the following non-limitative clauses:

1. Decorative panel, in particular a floor panel, ceiling panel or wall panel, comprising:
    a core provided with an upper side and a lower side,
    a decorative top structure affixed on said upper side of the core,
    a first panel edge comprising a first coupling profile, and a second panel edge comprising a second coupling profile being designed to engage interlockingly with said first coupling profile of an adjacent panel, both in horizontal direction and in vertical direction,
    wherein said core comprises:
    at least one composite layer comprising:
        at least one magnesia layer comprising magnesium oxide and/or magnesium oxide and/or magnesia cement,
        particles, in particular cellulose based particles, dispersed in said magnesia layer; and
        preferably at least one reinforcement layer embedded in said composite layer.

2. Panel according to clause 1, wherein the magnesia layer is based upon magnesium oxide and/or magnesium hydroxide.

3. Panel according to one of the foregoing clauses, wherein the magnesia layer as such is free of magnesium oxide.

4. Panel according to one of the foregoing clauses, wherein the magnesia layer as such comprises magnesium hydroxide.

5. Panel according to one of the foregoing clauses, wherein the magnesia layer comprises water, in particular hydrated water.

6. Panel according to one of the foregoing clauses, wherein the magnesia layer comprises magnesium chloride.

7. Panel according to one of the foregoing clauses, wherein the magnesia layer comprises magnesium oxychloride.

8. Panel according to one of the foregoing clauses, wherein the magnesia layer comprises $5Mg(OH)2 \cdot MgCl2 \cdot 8H2O$.

9. Panel according to one of the foregoing clauses, wherein the magnesia layer comprises $Mg2(OH)ClCO3 \cdot 3H_2O$.

10. Panel according to one of the foregoing clauses, wherein the magnesia layer comprises magnesite, in particular hydromagnesite ($Mg5(CO3)4(OH)2 \cdot 4H2O$).

11. Panel according to one of the foregoing clauses, wherein the magnesia layer is based upon monoammonium dihydrogen phosphate ($NH4H2PO4$).

12. Panel according to one of the foregoing clauses, wherein the magnesia layer comprises struvite ($NH4MgPO4 \cdot 6H2O$) and/or dittmarite ($NH4MgPO4 \cdot H2O$).

13. Panel according to one of the foregoing clauses, wherein the magnesia layer comprises $MgHPO4$.

14. Panel according to one of the foregoing clauses, wherein the magnesia layer is based upon monopotassium phosphate ($KH2PO4$).

15. Panel according to one of the foregoing clauses, wherein the magnesia layer comprises magnesium potassium phosphate hexahydrate ($MgKPO4 \cdot 6H2O$).

16. Panel according to one of the foregoing clauses, wherein the magnesia layer comprises at least one borate.

17. Panel according to one of the foregoing clauses, wherein the magnesia layer is based upon magnesium sulphate, in particular heptahydrate sulphate mineral epsomite ($MgSO4 \cdot 7H2O$).

18. Panel according to one of the foregoing clauses, wherein the magnesia layer comprises $5Mg(OH)2 \cdot MgSO4 \cdot 3H2O$ (513-phase) and/or $3Mg(OH)2 \cdot MgSO4 \cdot 8H2O$ (318-phase).

19. Panel according to one of the foregoing clauses, wherein the magnesia layer comprises $5Mg(OH)2 \cdot MgSO4 \cdot 5H2O$ (515-phase) and/or $Mg(OH)2 \cdot MgSO4 \cdot 7H2O$ (517-phase).

20. Panel according to one of the foregoing clauses, wherein the composite layer comprises citric acid.

21. Panel according to one of the foregoing clauses, wherein the composite layer comprises sodium silicate.

22. Panel according to one of the foregoing clauses, wherein the composite layer comprises sodium bicarbonate.

23. Panel according to one of the foregoing clauses, wherein the composite layer comprises dolomite.

24. Panel according to one of the foregoing clauses, wherein the composite layer comprises phosphoric acid ($H3PO4$) and/or at least one phosphate, in particular $H2PO4-$.

25. Panel according to one of the foregoing clauses, wherein the composite layer comprises at least one mineralizer selected from the group consisting of: sodium hydroxide ($NaOH$), calcium chloride ($CaCl2$), aluminium sulphate ($Al2(SO4)3$), and calcium hydroxide $Ca(OH)2$.

26. Panel according to one of the foregoing clauses, wherein the cellulose based particles comprise lignocellulose.

27. Panel according to one of the foregoing clauses, wherein the cellulose based particles comprise wood.

28. Panel according to one of the foregoing clauses, wherein at least a part of the cellulose based particles is formed by fibres.

29. Panel according to one of the foregoing clauses, wherein the cellulose based particles comprise hemp fibres.

30. Panel according to one of the foregoing clauses, wherein at least a part of the cellulose based particles is formed by powder.

31. Panel according to one of the foregoing clauses, wherein at least a part of the cellulose based particles is formed by wood shavings.

32. Panel according to one of the foregoing clauses, wherein at least a part of the cellulose based particles is formed by wool in particular wood wool.

33. Panel according to one of the foregoing clauses, wherein at least a part of the cellulose based particles is formed by wood chips.

34. Panel according to one of the foregoing clauses, wherein the core comprises dispersed particles being made of another material than cellulose.

35. Panel according to one of the foregoing clauses, wherein the composite layer comprises at least one additional filler selected from the group consisting of: steel, glass, polypropylene, wood, acrylic, alumina, curaua, carbon, cellulose, coconut, kevlar, nylon, perlon, polyethylene, PVA, rock wool, sisal, and fique.

36. Panel according to one of the foregoing clauses, wherein the composite layer comprises sodium carboxymethyl cellulose.

37. Panel according to one of the foregoing clauses, wherein the composite layer comprises fly ash.

38. Panel according to one of the foregoing clauses, wherein the composite layer comprises silica fume.

39. Panel according to one of the foregoing clauses, wherein the composite layer comprises iron oxide.

40. Panel according to one of the foregoing clauses, wherein the composite layer comprises fatty acids.

41. Panel according to one of the foregoing clauses, wherein the composite layer comprises alkali metal sulphates.

42. Panel according to one of the foregoing clauses, wherein at least one composite layer comprises at least one polymer, such as PVC or PUR.

43. Panel according to one of the foregoing clauses, wherein at least one composite layer is free of polymers.

44. Panel according to one of the foregoing clauses, wherein the composite layer comprises perlite, preferably expanded perlite.

45. Panel according to one of the foregoing clauses, wherein the composite layer comprises at least one fire-retardant additive.

46. Panel according to one of the foregoing clauses, wherein the composite layer is at least partially foamed.

47. Panel according to one of the foregoing clauses, wherein the composite layer is free of plasticizer.

48. Panel according to one of the foregoing clauses, wherein the reinforcement layer is a non-woven layer or woven layer, in particular a cloth.

49. Panel according to one of the foregoing clauses, wherein the reinforcement layer comprises fiberglass.

50. Panel according to one of the foregoing clauses, wherein the reinforcement layer comprises natural fibres, such as jute.

51. Panel according to one of the foregoing clauses, wherein the reinforcement layer comprises synthetic fibres, in particular polymer fibres.

52. Panel according to one of the foregoing clauses, wherein the composite layer comprises at least 50% by weight, preferably in between 50 and 90% by weight, of magnesia layer.

53. Panel according to one of the foregoing clauses, wherein the composite layer comprises in between 1 and 15% by weight of cellulose based fibres.

54. Panel according to one of the foregoing clauses, wherein the composite layer comprises in between 0 and 3% by weight of perlite.

55. Panel according to one of the foregoing clauses, wherein the composite layer comprises in between 1 and 8% by weight of reinforcement layer.

56. Panel according to one of the foregoing clauses, wherein at least one composite layer has a density greater than 1 kg/m3.

57. Panel according to one of the foregoing clauses, wherein at least one composite layer has a density lower than 1 kg/m3.

58. Panel according to one of the foregoing clauses, wherein the core is provided with a waterproof coating substantially covering the at least one composite layer.

59. Panel according to one of the foregoing clauses, wherein a waterproof layer is situated in between the core and the top structure.

60. Panel according to one of the foregoing clauses, wherein composite layer comprises a plurality of reinforcement layer layers, wherein, preferably, at least one first reinforcement layer is located in a top portion of the composite layer, and wherein at least one second reinforcement layer is located in a bottom portion of the composite layer.

61. Panel according to one of the foregoing clauses, wherein the core comprises a laminate of composite layers, which are either directly and/or indirectly, stacked onto each other.

62. Panel according to one of the foregoing clauses, wherein the core comprises a laminate of composite layers, wherein the composition of at least two composite layers is mutually different.

63. Panel according to one of the foregoing clauses, wherein the top structure is adhered onto the core by means of a waterproof adhesive.

64. Panel according to one of the foregoing clauses, wherein the top structure comprises at least one decorative layer and at least one transparent wear layer covering said decorative layer.

65. Panel according to clause 64, wherein the wear layer has a melt temperature of above 100 degrees Celsius, wherein the wear layer is preferably made of polyurethane.

66. Panel according to one of the foregoing clauses, wherein the panel comprises a backing layer attached to a rear side of the core.

67. Panel according to one of the foregoing clauses, wherein at least one reinforcement layer extends in only one coupling profile of the first and second coupling profile.

68. Panel according to one of the foregoing clauses, wherein the panel, preferably the core, comprises recycled material.

69. Panel according to one of the foregoing clauses, wherein the panel thickness is situated in between 3 and 10 mm.

70. Panel according to one of the foregoing clauses, wherein the first coupling profile comprises:
   an upward tongue,
   at least one upward flank lying at a distance from the upward tongue,
   an upward groove formed in between the upward tongue and the upward flank wherein the upward groove is adapted to receive at least a part of a downward tongue of a second coupling profile of an adjacent panel, and
   at least one first locking element, preferably provided at a distant side of the upward tongue facing away from the upward flank,
and wherein the second coupling profile comprises:
   a first downward tongue,
   at least one first downward flank lying at a distance from the downward tongue,
   a first downward groove formed in between the downward tongue and the downward flank, wherein the downward groove is adapted to receive at least a part of an upward tongue of a first coupling profile of an adjacent panel, and
   at least one second locking element adapted for co-action with a first locking element of an adjacent panel, said second locking element preferably being provided at the downward flank.

71. Panel according to any of the foregoing clauses, wherein the panel comprises at least one third coupling profile and at least one fourth coupling profile located respectively at a third panel edge and a fourth panel edge, wherein the third coupling profile comprises:
   a sideward tongue extending in a direction substantially parallel to the upper side of the core,
   at least one second downward flank lying at a distance from the sideward tongue, and
   a second downward groove formed between the sideward tongue and the second downward flank,
wherein the fourth coupling profile comprises:
   a third groove configured for accommodating at least a part of the sideward tongue of the third coupling profile of an adjacent panel, said third groove being defined by an upper lip and a lower lip, wherein said lower lip is provided with an upward locking element,
wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

72. Decorative covering, in particular a decorative floor covering, decorative ceiling covering, or decorative wall covering, comprising a plurality of mutually coupled decorative panels according to any of clauses 1-71.

The ordinal numbers used in this document, like "first", "second", and "third" are used only for identification purposes. Hence, the use of the expressions "third locking element" and "second locking element" does therefore not necessarily require the co-presence of a "first locking element".

The decorative panels according to the invention may also be referred to as decorative tiles. By "complementary" coupling profiles is meant that these coupling profiles can cooperate with each other. However, to this end, the complementary coupling profiles do not necessarily have to have complementary forms. By locking in "vertical direction" is meant locking in a direction perpendicular to the plane of the panel. By locking in "horizontal direction" is meant locking in a direction perpendicular to the respective coupled edges of two panels and parallel to or falling together with the plane defined by the panels.

BRIEF DESCRIPTION OF THE DRAWINGS

The invention will be elucidated on the basis of non-limitative exemplary embodiments shown in the following figures, wherein:

FIG. 1b shows a schematic representation of a multi-purpose panel system comprising a plurality of multi-purpose panels as shown in FIG. 1a;

FIG. 2b shows a schematic representation of a multi-purpose panel system comprising a plurality of multi-purpose panels as shown in FIG. 2a;

FIG. 3b shows a schematic representation of a multi-purpose panel system comprising a plurality of multi-purpose panels as shown in FIG. 3a;

FIG. 4a shows a cross-section along line A-A of a multi-purpose panel as shown in FIG. 1a, 2a or 3a;

FIG. 4b shows a cross-section along line B-B of a multi-purpose panel as shown in FIG. 1a, 2a or 3a;

FIGS. 5a-5c show a cross-section of two multi-purpose panels as shown in FIG. 1a, 2a or 3a in a first, second and third coupled condition respectively;

FIGS. 7a-7c show a cross-section of two multi-purpose panels with further alternative coupling profiles in a first, second and third coupled condition respectively.

DESCRIPTION OF THE INVENTION

Figure 1A:
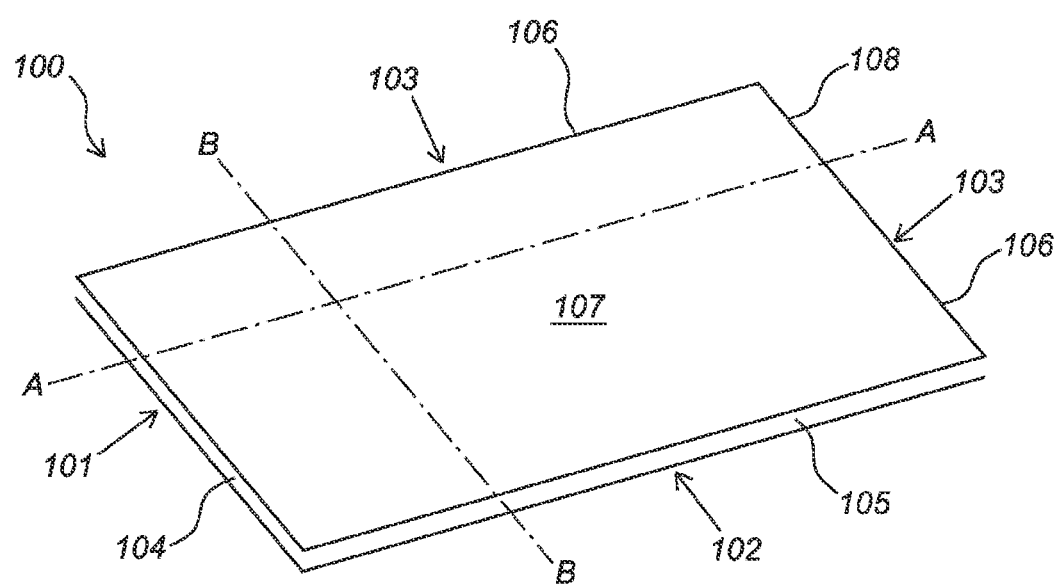
FIG. 1a shows a schematic representation of a multi-purpose panel for use in a multi-purpose panel system according to the invention.

FIG. 1a shows a schematic representation of a multi-purpose decorative panel (100) for use in a multi-purpose panel system (110) according to the invention. The figure shows a panel (100) comprising a first pair of opposing edges consisting of a first edge (101) and an opposite third edge (103) and a second pair of opposing edges consisting of a second edge (102) and an(other) opposing third edge (103). The first, second and third edges (101, 102, 103) are respectively provided with first, second and third coupling profiles (104, 105, 106). The first coupling profile (104) and the third coupling profile (106) are configured such that two of such panels (100) can be coupled to each other at the first and third edges (101, 103) by means of a turning movement. Moreover, the second coupling profile (105) and the third coupling profile (106) are configured such that the two of such panels (100) can be coupled to each other at the second and third edges (102, 103) by means of a fold-down movement and/or a vertical movement. The proportional relationship between the width and the length of the panel (100) may be chosen at will. FIG. 1a shows only one of the many possibilities wherein the panel has a upper side (107) with a rectangular contour (108). It is however also possible that the width and the length of the panel (100) are the same such that the panel (100) has an upper side (107) with a square contour.

Figure 1B:
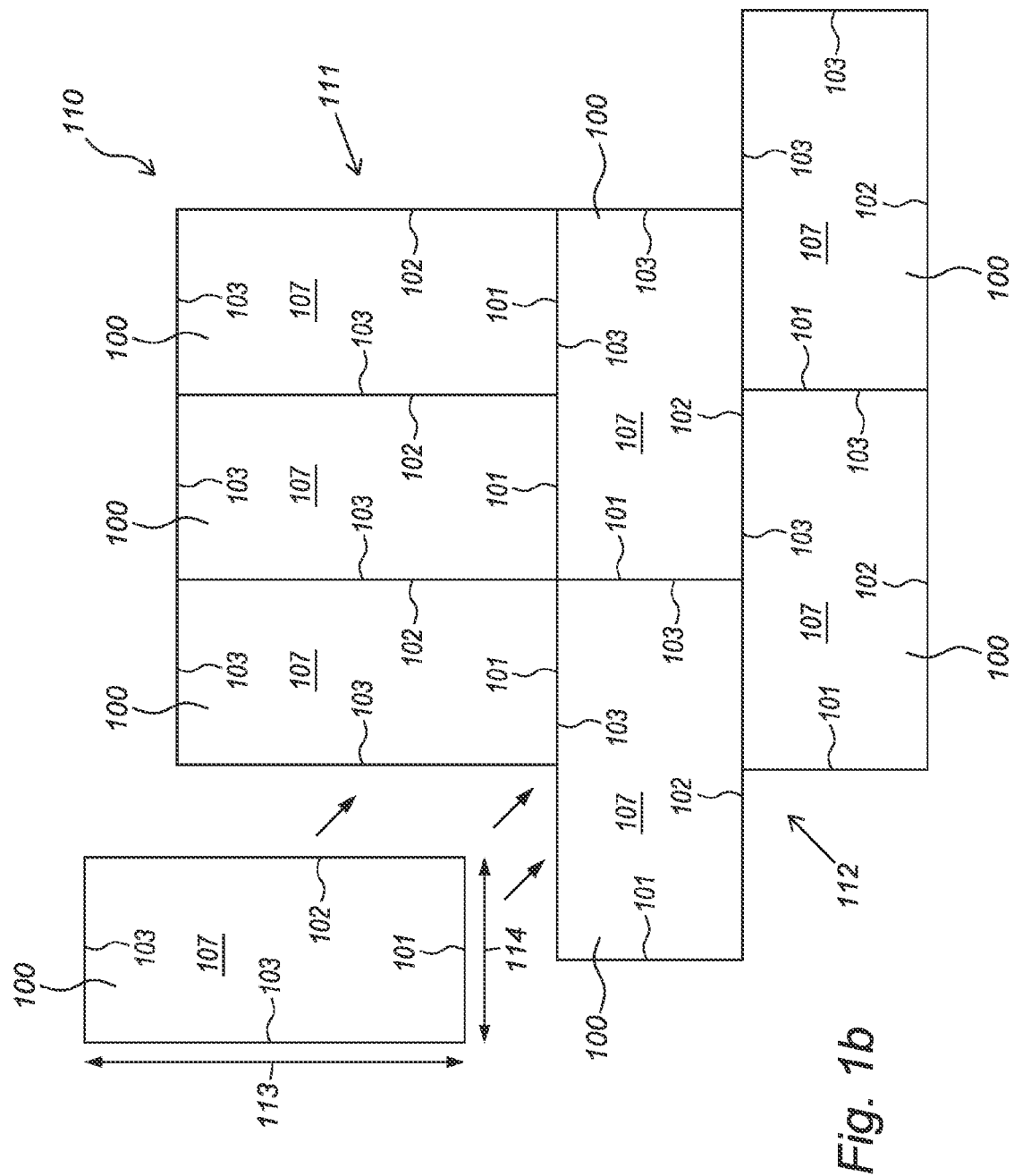

FIG. 1b shows a schematic representation of a multi-purpose panel system (110) comprising a plurality of multi-purpose panels (100) as shown in FIG. 1a. Although each of the panels (100) are equivalent, having a first pair of opposing edges consisting of a first edge (101) and an opposite third edge (103) and a second pair of opposing edges consisting of a second edge (102) and an opposing third edge (103), the panels (100) may, due to the compatibility of the coupling profile of the third edge (103) with the coupling profile of both the first and the second edge (101, 102), be joined in different ways, resulting in differential panel patterns (111, 112) within one multi-purpose panel system (110). In the depicted multi-purpose panel system (110) wherein the individual panels (110) have an upper side (107) with a rectangular contour (108), the panels (100) each have a long side (113) and a short side (114). The different panel patterns (111, 112) are hereby created by coupling a first panel pattern (111) of interconnected panels (100), having their long side (113) connected to the long side (113) of an adjacent panel (100), to a second panel pattern (112) of interconnected panels (100), having their long side (113) connected to the long side (113) of an adjacent panel (100) and their short side (114) connected to the short side (114) of another adjacent panel (100). The first and second panel patterns (111, 112) are hereby rotated to each other such that the long sides (113) of the panels (100) of the first panel pattern (111) lie at a 90 degree angle relative to the long sides (113) of the panels (100) of the second panel pattern (112). This coupling between the different panel patterns (111, 112) is made possible through the connection of the short sides (114) of the panels (100) of the first panel pattern (111) to the long sides (113) of the panels (100) of the second panel pattern (112). Installation of the panel system (110) can be realized by angling down the first edge (101) of a panel (100) to be installed with respect to a third edge (103) of an already installed panel (100), which will commonly mutually lock said panels (100) in both vertical and horizontal direction. During this angling or turning movement of the panel (100) to be installed with respect to the already installed panel (100), the second edge (102) of the panel (100) to be installed will be connected (simultaneously) to the third edge (103) of another already installed panel (100), which is typically realized by lowering or folding down the panel (100) to be installed with respect to the other already installed panel (100) during which the second edge (102) of the panel (100) to be installed and the third edge (103) of the other already installed panel (100) will be scissored (zipped) into each other. This results in a locking of the panel (100) to be installed with respect to the other already installed panel (100) both in horizontal and vertical direction.

Figure 2A:
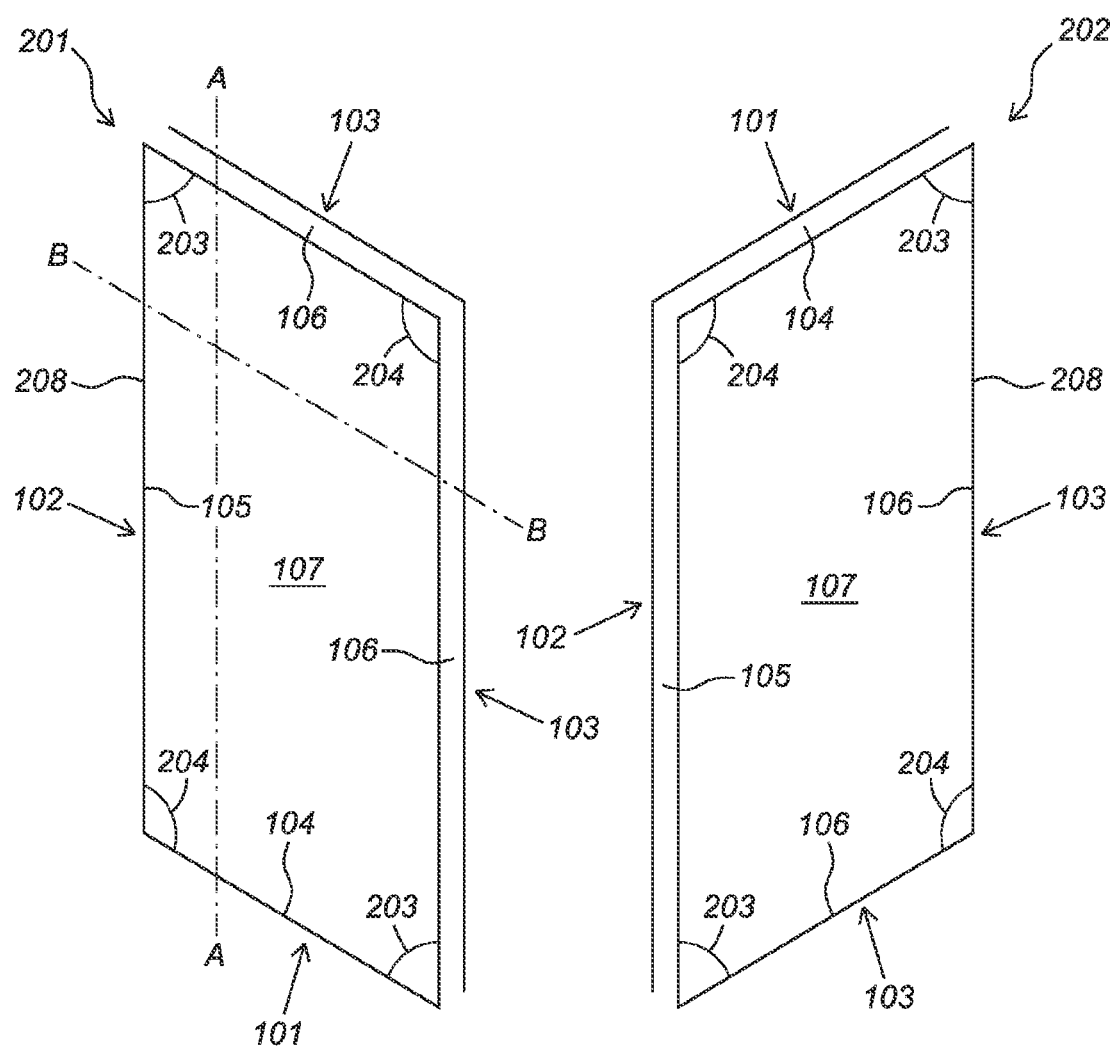
FIG. 2a shows a schematic representation of two different types of multi-purpose panels for use in another embodiment of a multi-purpose panel system according to the invention.

FIG. 2a shows a schematic representation of two different types of multi-purpose panels (201, 202) for use in another embodiment of a multi-purpose panel system (200) according to the invention. Just as the multi-purpose panel (100) shown in FIG. 1a, each of these panels (201, 202) comprises a first pair of opposing edges consisting of a first edge (101) and an opposite third edge (103) and a second pair of opposing edges consisting of a second edge (102) and an opposing third edge (103). Again, the first, second and third edges (101, 102, 103) are respectively provided with first, second and third coupling profiles (104, 105, 106), wherein the first coupling profile (104) and the third coupling profile (106) are configured such that two panels (201, 202) can be coupled to each other at the first and third edges (101, 103) by means of a turning movement, and the second coupling profile (105) and the third coupling profile (106) are configured such that the two panels (201, 202) can be coupled to each other at the second and third edges (102, 103) by means of a fold-down movement and/or a vertical movement. This time however, there are two different types of panels (201, 202), wherein the coupling profiles (105, 106) of one pair of opposing edges (102, 103) on the first type of panel (201) are arranged in a mirror-inverted manner relative to the coupling profiles (105, 106) of the corresponding pair of opposing edges (102, 103) on the second type of panel (202). Note that the depicted edge pairs of the different types of panels (201, 202) that are mirror-inverted are formed by second and third edges (102, 103). However it is likewise possible that the mirror-inverted edge pairs are formed by first and third edges (101, 103). Moreover, the multi-purpose panels (201, 202) for use in this multi-purpose panel system (200) have an upper side (107) with a parallelogram-shaped contour (208). Two adjoining edges (101, 102, 103) of these panels (201, 202) hereto either enclose an acute angle (203) or a obtuse angle (204). In this specific embodiment, the first and second edge (101, 102) respectively the third edges (103) enclose an obtuse angle (204) of the same size, while the first and the third edge (101, 103) respectively the second and third edge (102, 103) enclose an acute angle (203) of the same size. The difference in panel configuration and parallelogram-shaped contour (208) of their upper side (107) allows these panels (201, 202) to form a chevron pattern (205) in a joined state.

Figure 2B:
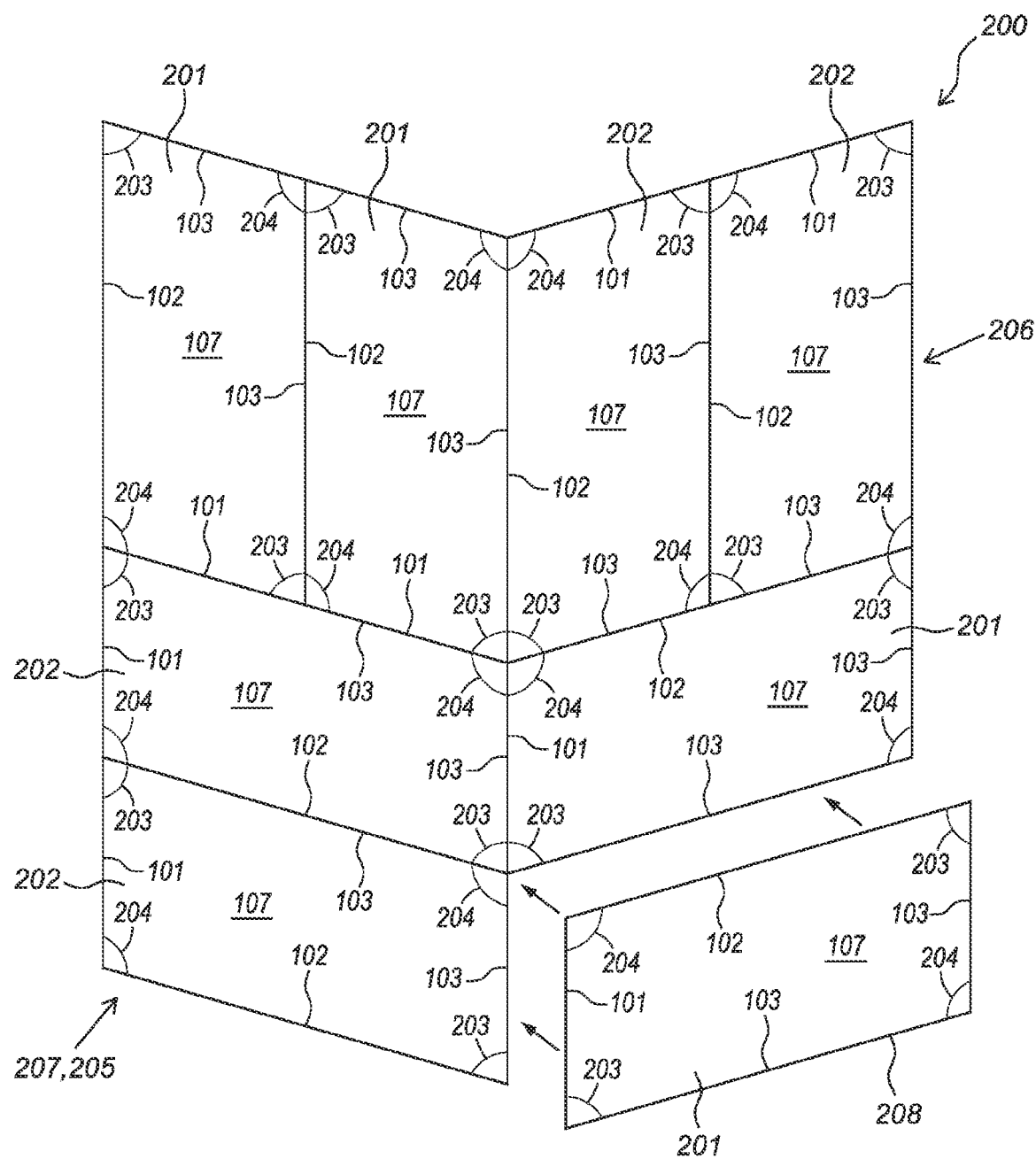

FIG. 2b shows a schematic representation of a multi-purpose panel system (200) comprising a plurality of multi-purpose panels (201, 202) as shown in FIG. 2a. As already discussed previously, the multi-purpose panels (201, 202) forming part of this multi-purpose panel system (200) come in two different (mirrored) types/configurations. While the difference in panel configuration and parallelogram-shape of their top surface (107) allows these panels (201, 202) to form a chevron pattern (205) in a joined state, having a first pair of opposing edges consisting of a first edge (101) and an opposite third edge (103) and a second pair of opposing edges consisting of a second edge (102) and an opposing third edge (103), wherein the coupling profile (106) of the third edge (103) is compatible with the coupling profile (104, 105) of both the first and the second edge (101, 102), allows the panels (201, 202) to be joined in different ways as well, resulting in differential panel patterns (206, 207) within one interconnected multi-purpose panel system (200). Like in the multi-purpose panel system (110) shown in FIG. 1b, the different panel patterns (206, 207) are created by coupling a first panel pattern (206) of interconnected panels (201, 202) to a second panel pattern (207) of interconnected panels (201, 202). Within these separate panel patterns (206, 207), each panel (201, 202) has each of its pairs of opposing edges (101, 103; 102, 103) connected to the edges (101, 102, 103) of adjacent panels (201, 202) being part of a corresponding pair of opposing edges (101, 103; 102, 103) of said adjacent panels (201, 202). The coupling of the first and second panel patterns (206, 207) is however realized through the connection of a panel (201, 202) of first panel pattern (206) with an edge (101, 103) forming part of one pair of opposing edges (101, 103) to a panel (201, 202) of second panel pattern (207) with an edge (102, 103) forming part of the other, non-corresponding pair of opposing edges (102, 103). The result is an interconnected, multi-purpose panel system (200) comprising two different panel patterns (206, 207) that are rotated 90 degrees relative to each other. Installation of the panel system (200) shown in FIG. 2b is typically analogous to the installation of the panel system (110) shown in FIG. 1b.

Figure 3A:
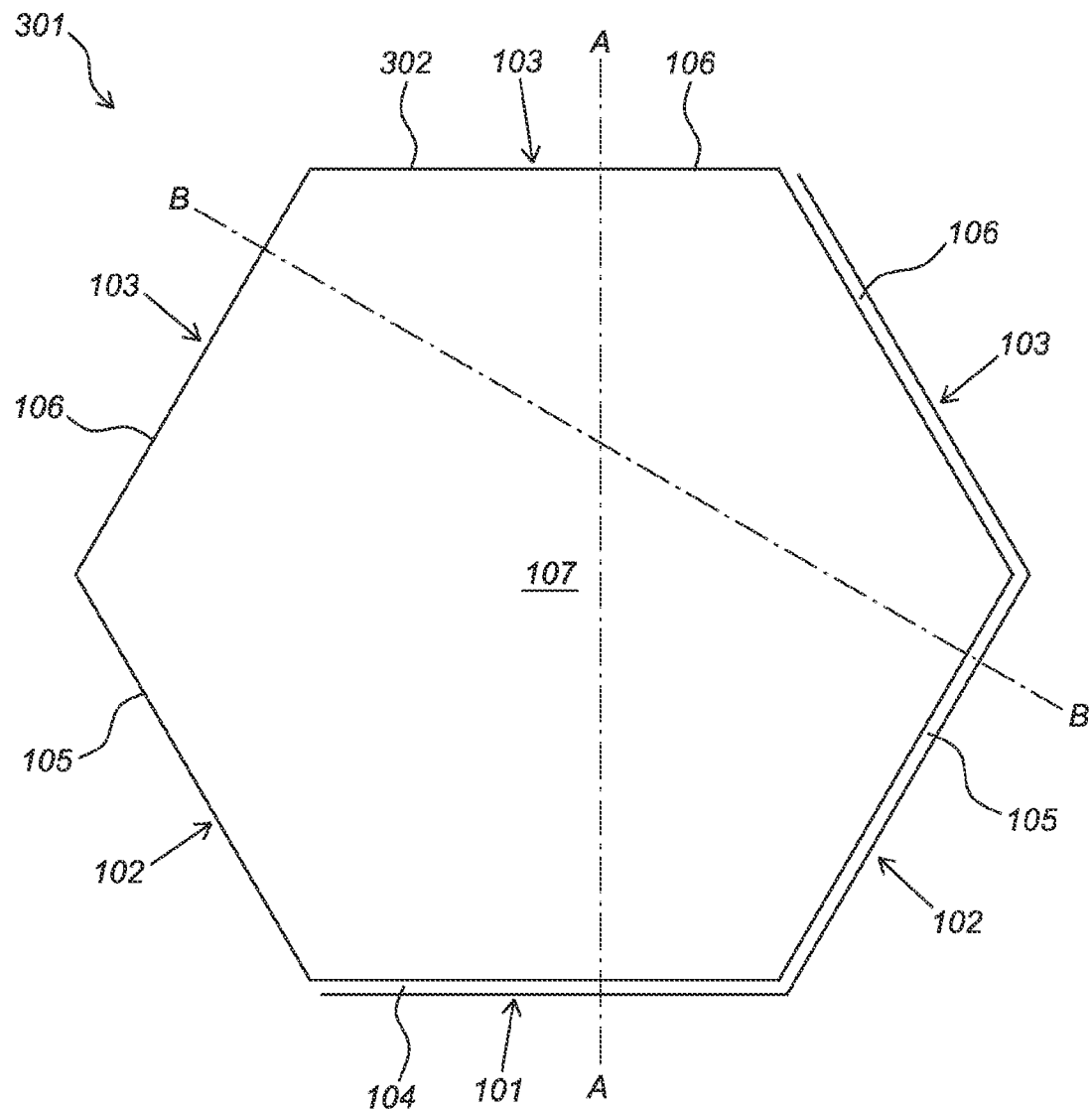
FIG. 3a shows a schematic representation of a multi-purpose panel for use in yet another embodiment of a multi-purpose panel system according to the invention.

FIG. 3a shows a schematic representation of a multi-purpose panel (301) for use in yet another embodiment of a multi-purpose panel system (300) according to the invention. Other than the multi-purpose panels (100, 201, 202) shown in FIGS. 1a and 2a, each of these panels (301) comprises three pairs of opposing edges and has an upper side (107) with a regular hexagon-shaped contour (302). The first pair of opposing edges consists of a first edge (101) and an opposite third edge (103). The second and third pair of opposing edges consist of a second edge (102) and an opposing third edge (103). The first, second and third edges (101, 102, 103) are hereby positioned such that the third edges (103) lie directly adjacent to each other and the second edges (102) lie on both edges adjacent to the first edge (101). The second edges (102), as a consequence, do not lie adjacent to each other. The commonality between these multi-purpose panels (301) and the multi-purpose panels (100, 201, 202) shown in FIGS. 1a and 2a is however that the first, second and third edges (101, 102, 103) are respectively provided with first, second and third coupling profiles (104, 105, 106), wherein the first coupling profile (104) and the third coupling profile (106) are configured such that two panels (301) can be coupled to each other at the first and third edges (101, 103) by means of a turning movement, and the second coupling profile (105) and the third coupling profile (106) are configured such that the two panels (301)

can be coupled to each other at the second and third edges (102, 103) by means of a fold-down movement and/or a vertical movement.

Figure 3B:
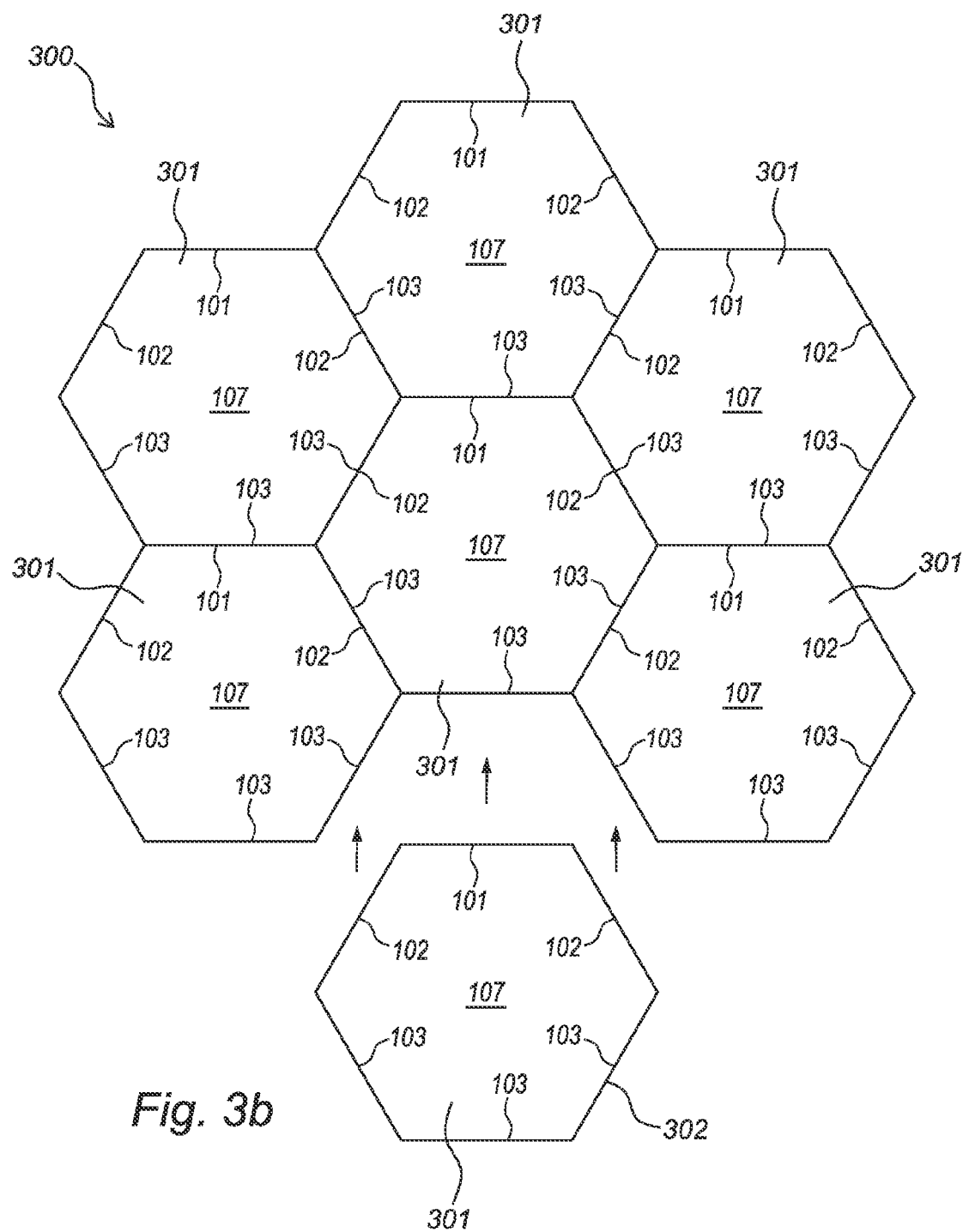

FIG. 3b shows a schematic representation of a multi-purpose panel system (300) comprising a plurality of multi-purpose panels (301) as shown in FIG. 3a. In the depicted panel formation, the panels (301) are all identically oriented. Installation of the panel system (300) can be realized in a similar fashion as the panel systems (110, 200) of FIGS. 1b and 2b. By angling down the first edge (101) of a panel (301) to be installed with respect to a third edge (103) of an already installed panel (301), said panels (301) will commonly mutually lock in both vertical and horizontal direction. During this angling or turning movement of the panel (301) to be installed with respect to the already installed panel (301), one or more second edges (102) of the panel (300) to be installed will be connected (simultaneously) to a third edge (103) of one or more other already installed, adjacent panels (301), which is typically realized by lowering or folding down the panel (301) to be installed with respect to the other already installed panel(s) (301) during which said second edge(s) (102) of the panel (301) to be installed and the third edge(s) (103) of the other already installed panel(s) (301) will be scissored (zipped) into each other. This results in a locking of the panel (301) to be installed with respect to the other already installed panel(s) (301) both in horizontal and vertical direction.

Figure 4A:
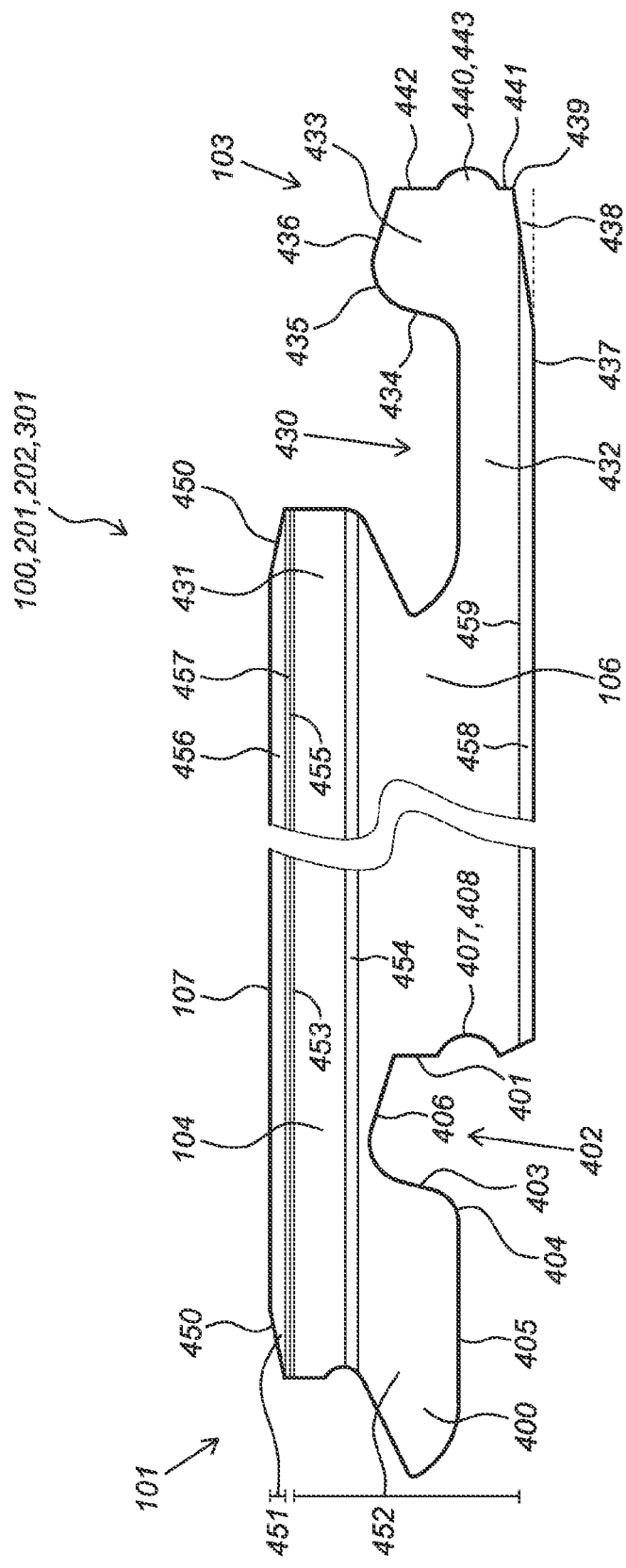

FIG. 4a shows a cross-section along line A-A of a multi-purpose panel (100, 201, 202, 301) as shown in FIG. 1a, 2a or 3a. In the figure, the first edge (101) and an opposing third edge (103) of the panel (100, 201, 202, 301) are visible, having a first coupling profile (104) and a third coupling profile (106) respectively. The first coupling profile (104) comprises a sideward tongue (400) extending in a direction substantially parallel to the upper side (107) of the panel (100, 201, 202, 301), at least one first downward flank (401) lying at a distance from the sideward tongue (400), and a first downward recess (402) formed between the sideward tongue (400) and the first downward flank (401). The proximal side (403) of the sideward tongue (400) of the first coupling profile (104), facing the first downward recess (402), is hereby downwardly inclined in a direction away from the first downward flank (401). It is however likewise possible that the proximal side (403) of the sideward tongue (400) is downwardly inclined in a direction towards the first downward flank (401). A first transition zone (404) can be defined between the proximal side (403) of the sideward tongue (400) of the first coupling profile (104) and a lower side (405) of the sideward tongue (400) of the first coupling profile (104), which first transition zone (404) is in this instance curved. The upper side (406) of the first downward recess (402) is in the depicted panel (100, 201, 202, 301) inclined downwardly towards the first downward flank (401). The first coupling profile (104) may furthermore comprise a first locking element (407) which may, in a coupled position, co-act with a third locking element (440) of a third coupling profile (106) of an adjacent panel (100, 201, 202, 301). This first locking element (407) may be provided at the first downward flank (401) of the first coupling profile (104). In the presently depicted panel (100, 201, 202, 301), the first locking element (407) comprises at least one first locking groove (408).

The third coupling profile (106) comprises a third recess (430) configured for accommodating at least a part of the sideward tongue (400) of the first coupling profile (104) of a further panel (100, 201, 202, 301), said third recess (430) being defined by an upper lip (431) and a lower lip (432), wherein said lower lip (432) is provided with an upward locking element (433). The proximal side (434) of the upward locking element (433) of the third coupling profile (106), facing the third recess (430), is upwardly inclined in a direction away from the upper lip (431). It may however be possible as an alternative that the proximal side (434) of the upward locking element (433) is upwardly inclined in a direction towards the upper lip (431). A third transition zone (435) can be defined between the proximal side (434) of the upward locking element (433) and an upper side (436) of the upward locking element (433), which third transition zone (435) is in this instance also curved to follow the curved first transition zone (404). The upper side (436) of the upward locking element (433) is in the depicted panel (100, 201, 202, 301) inclined downwardly in a direction facing way from the upper lip (431) of the third coupling profile (106). At the lower side (437) of the lower lip (432) of the third coupling profile (106), a recess (438) is present, which extends up to the distal end (439) of the lower lip (432). This recess (438) allows bending of the lower lip (432) in a downward direction. As already mentioned, the third coupling profile (106) may further comprise a third locking element (440) that may co-act with the first locking element (407) of the first coupling profile (104) of an adjacent panel (100, 201, 202, 301) to establish a vertical lock between the coupled panels (100, 201, 202, 301). The third locking element (440) may hereto provided at a distal side (441) of the lower lip (432) facing away from the third recess (430) and/or at a distal side (442) of the upward locking element (433) facing away from the third recess (430). The third locking element (440) may, as depicted here, specifically be positioned at a distance both from a lower side (437) of the lower lip (432) and an upper side (436) of the upward locking element (433). In the presently depicted panel, the third locking element (440) comprises at least one outward bulge (443) which outward bulge (443) is adapted to be at least partially received in the first locking groove (408) or a second locking groove (423) of an adjacent coupled panel (100, 201, 202, 301) for the purpose of realizing a (vertically) locked coupling. The core (452) is provided with at least one reinforcing layer (454), such as a glass fibre layer (cloth), incorporated (embedded), in the core (452). More in particular, the core comprises at least one composite layer comprising at least one magnesia cement, cellulose based particles dispersed in said magnesia cement; and at least one reinforcement layer (454) embedded in said composite layer. The shown composite layer may be considered as a single layer, although a part is situated above the reinforcement layer (454) and a part is situated below the reinforcement layer (454), wherein both parts are mutually (integrally) connected by composite material present in the pores of the reinforcement layer. Examples of detailed compositions and additives have been described in the above already in a comprehensive manner.

Figure 4B:
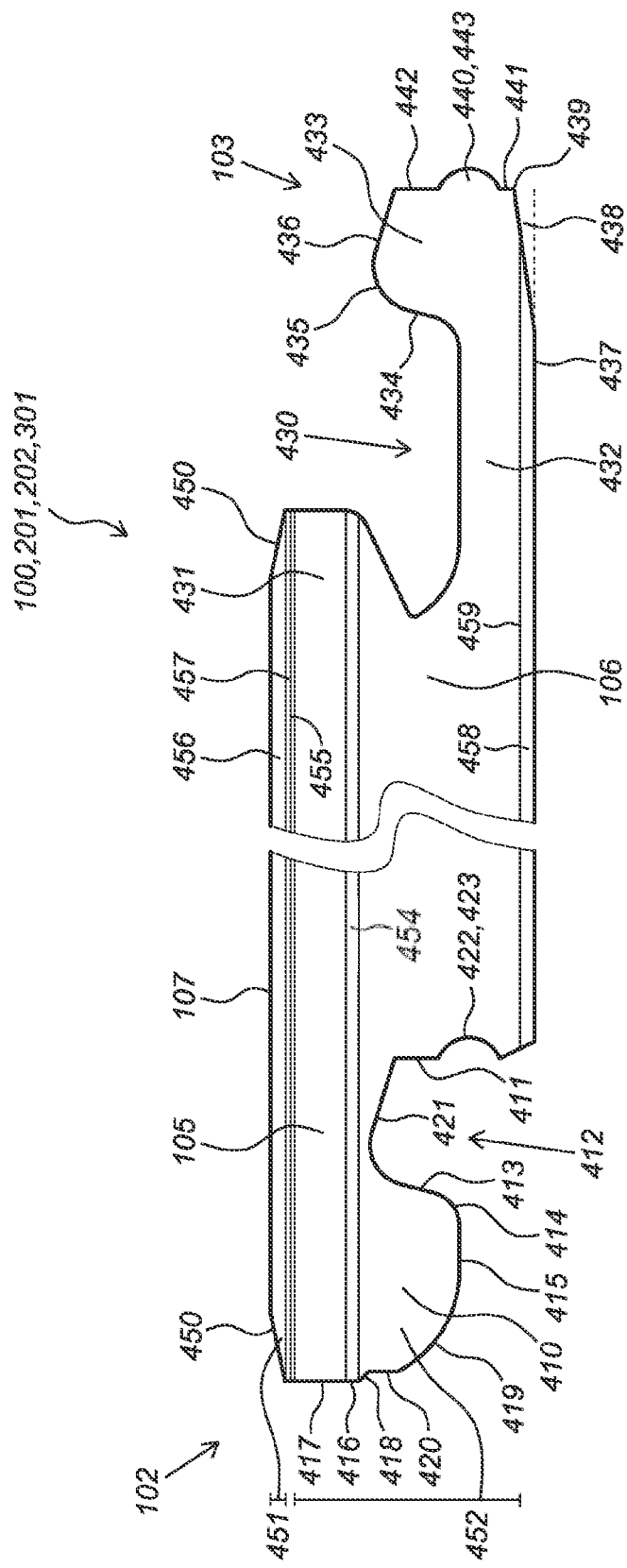

FIG. 4b shows a cross-section along line B-B of a multi-purpose panel (100, 201, 202, 301) as shown in FIG. 1a, 2a or 3a. In the figure, the second edge (102) and another opposing third edge (103) of the panel (100, 201, 202, 301) are visible, having a second coupling profile (105) and a third coupling profile (106) respectively. Where the third coupling profile (106) matches the third coupling (106) profile provided on the adjacent third edge (103) of the panel (100, 201, 202, 301), which characteristics are given above in the description of the cross-section along line A-A of the multi-purpose panel (100, 201, 202, 301), the second coupling profile (105) comprises a downward tongue (410) extending in a direction substantially perpendicular to the upper side (107) of the panel (100, 201, 202, 301), at least one second downward flank (411) lying at a distance from the downward tongue (410), and a second downward recess (412) formed between the downward tongue (410) and the second downward flank (411). The proximal side (413) of the downward tongue (410) of the second coupling profile (105), facing the second downward recess (412), is hereby downwardly inclined in a direction away from the second downward flank (411). It is however also possible that the proximal side (413) of the downward tongue (410) is downwardly inclined in a direction towards the second downward flank (411). A second transition zone (414) can be defined between the proximal side (413) of the downward tongue (410) of the second coupling profile (105) and a lower side (415) of the downward tongue (410) of the second coupling profile (105), which second transition zone (414) is in this instance curved. A distal side (416) of the downward tongue (410), facing away from the second downward recess (412), comprises at least a vertical upper wall part (417) adjacent to the upper side (107) of the panel (100, 201, 202, 301), and, adjacent to and located below said vertical upper wall part (417), an angled wall part (418) that angles inward toward a chamfered and/or curved lower wall part (419) of said distal side (416) of the downward tongue (410). An intermediate vertical wall part (420) may hereby be present between the angled wall part (418) and the chamfered and/or curved lower wall part (419). The lower wall part (419) of distal side (416) of the downward tongue (410) may moreover be connected to the lower side (415) of the downward tongue (410). The upper side (421) of the second downward recess (412) is in the depicted panel (100, 201, 202, 301) inclined downwardly towards the second downward flank (411). The second coupling profile (105) may furthermore comprise at least one second locking element (422) which may, in a coupled position, co-act with a third locking element (440) of a third coupling profile (106) of an adjacent panel (100, 201, 202, 301) to establish a vertical lock between the panels (100, 201, 202, 301). The second locking element (422) may hereto be provided at the second downward flank (411) of the second coupling profile (105). In the presently depicted panel (100, 201, 202, 301), the second locking element (422) comprises at least one second locking groove (423) adapted to at least partially receive the outward bulge (443) of the third locking element (440) of an adjacent coupled panel (100, 201, 202, 301) for the purpose of realizing a (vertically) locked coupling.

The coupling profiles (104, 105, 106) of each of the multi-purpose panels (100, 201, 202, 301) shown in FIGS. 4a and 4b are provided with chamfers (bevels) (450) at or near the upper side (107) of the panels (100, 201, 202, 301). The panels (100, 201, 202, 301) comprise an upper substrate (451) affixed to an upper side (453) of a core (452) to which the first, second and third coupling profiles (104, 105, 106) are integrally connected. The at least one reinforcing layer (454), such as a glass fibre layer (cloth), as embedded in the core (452), is visualized again. Both FIG. 4a and FIG. 4b shows that this reinforcing layer (454) is present only in one of two complementary coupling profiles. The upper substrate (451) comprises a decorative layer (455), an abrasion resistant wear layer (456) covering said decorative layer (455) and a transparent finishing layer (457) situated in between the decorative layer (455) and the wear layer (456). The panels (100, 201, 202, 301) moreover comprise a backing layer (458) affixed to a bottom side (459) of the core (452).

Figure 5A:
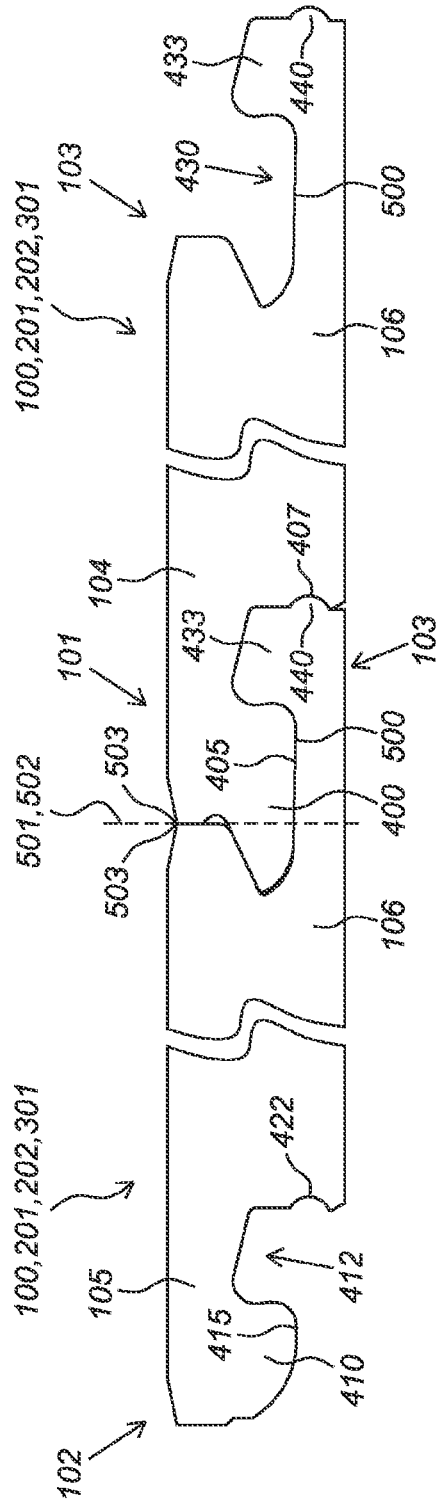
Figure 5B:
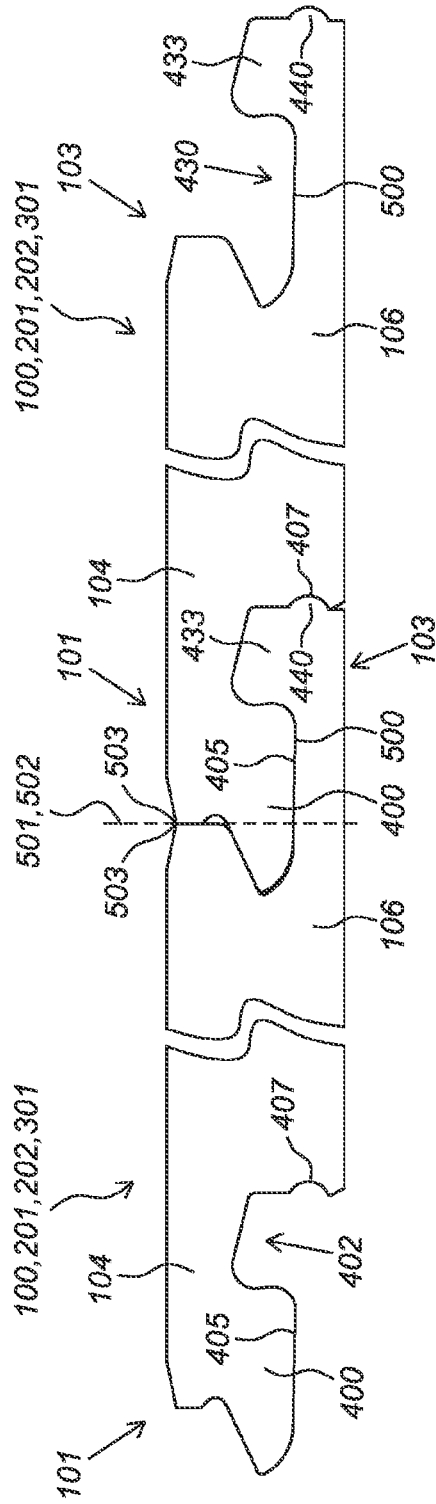

FIGS. 5a-5c show a cross-section of two multi-purpose panels (100, 201, 202, 301) as shown in FIG. 1a, 2a or 3a in a first, second and third coupled condition respectively. In these figures it can be seen that in coupled condition, at least a part of the sideward tongue (400) of the first coupling profile (104) of a panel (100, 201, 202, 301) is inserted into the third recess (430) of the third coupling profile (106) of an adjacent panel (100, 201, 202, 301), and at least a part of the upward locking element (433) of the third coupling profile (106) is inserted into the first downward recess (402) of the first coupling profile (104). To establish a fixation in the mutual position of the first coupling profile (104) and the third coupling profile (106), a lower side (405) of the sideward tongue (400) of the first coupling profile (104) may hereby be supported by a lower surface (500) of the third recess (430) of the third coupling profile (106). The first edge (101) and the third edge (103), in coupled condition, define a first closing surface (501) defined as a first vertical plane (502) through the upper edges (503) of the coupled panels (100, 201, 202, 301). Each of the sideward tongue (400) and the third recess (430) hereby extends through said first vertical plane (502). In the shown embodiments, the first and third coupling profiles (104, 106) respectively comprise a first and third locking element (407, 440). The first and third locking element (407, 440) are hereby positioned such that the first locking element (407) is facing and co-acting with the third locking element (440) of the third coupling profile (106) to realise a vertical locking effect.

FIGS. 5a-5c moreover show that in coupled condition, at least a part of the downward tongue (410) of the second coupling profile (105) is inserted in the third recess (430) of the third coupling profile (106), and at least a part of the upward locking element (433) of the third coupling profile (106) is inserted in the second downward recess (412) of the second coupling profile (105). To establish a fixation in the mutual position of the second coupling profile (105) and the third coupling profile (106), a lower side (415) of the downward tongue (410) of the second coupling profile (105) may hereby be supported by a lower surface (500) of the third recess (430) of the third coupling profile (106). The second edge (102) and the third edge (103), in coupled condition, define a second closing surface (504) defining a second vertical plane (505) through the upper edges (503) of the coupled panels (100, 201, 202, 301). The downward tongue (410) is hereby positioned at one side of said second vertical plane (505), while the third recess (430) extends through said second vertical plane (505). In the shown embodiments, the second coupling profile (105) moreover comprises a second locking element (422). Said second locking element (422) is facing and co-acting with the third locking element (440) of the third coupling profile (106) to realise a vertical locking effect.

Figure 6A:
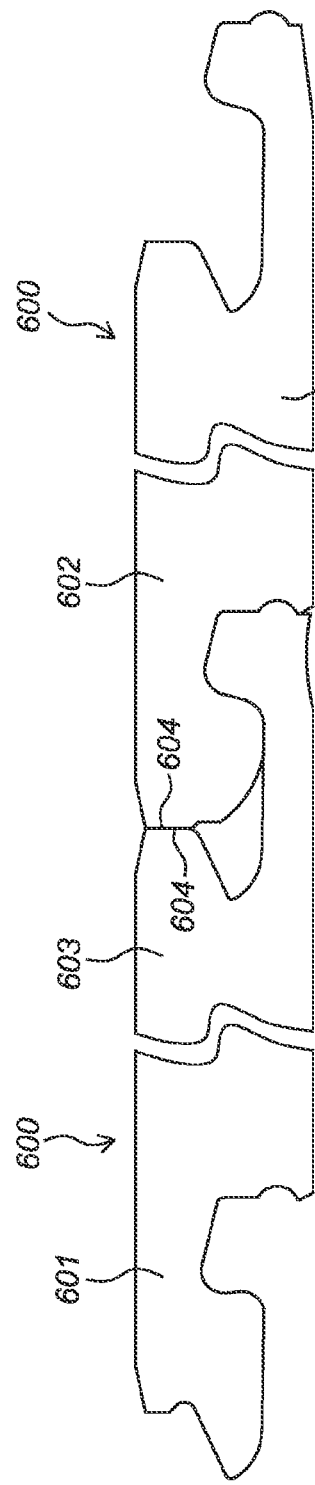
FIGS. 6a-6c show a cross-section of two multi-purpose panels with alternative coupling profiles in a first, second and third coupled condition respectively.
Figure 6B:
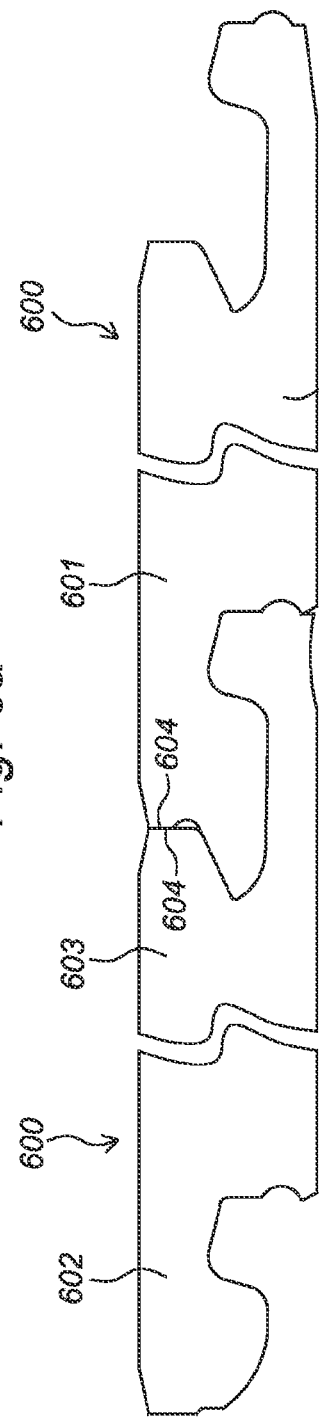
Figure 6C:
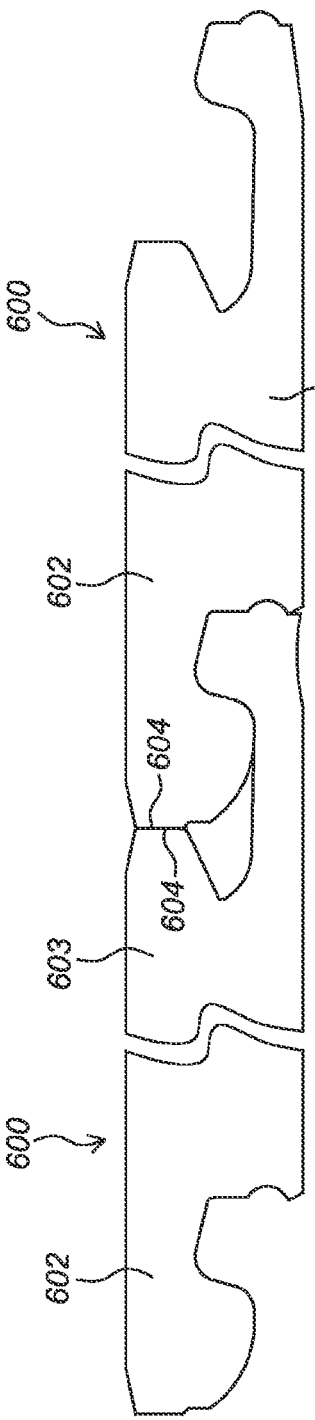

FIGS. 6a-6c show a cross-section of two multi-purpose panels (600) with alternative coupling profiles (601, 602, 603) in a first, second and third coupled condition respectively. Wherein the coupling profiles (104, 105, 106) of the panels (100, 201, 202, 301) shown in FIGS. 5a-5c are configured such that in a coupled condition, (substantially) no pretension exists between the coupling profiles (104, 105, 106), the coupling profiles (601, 602, 603) of the panels (600) shown in FIGS. 6a-6c are configured such that in coupled condition a pretension is existing, which forces the respective panels (600) at their respective edges (604) towards each other. In the shown embodiments of the coupling profiles (601, 602, 603), the pretension is the result of a (local) deformation of the coupling profiles (601, 602, 603).

Figure 7C:
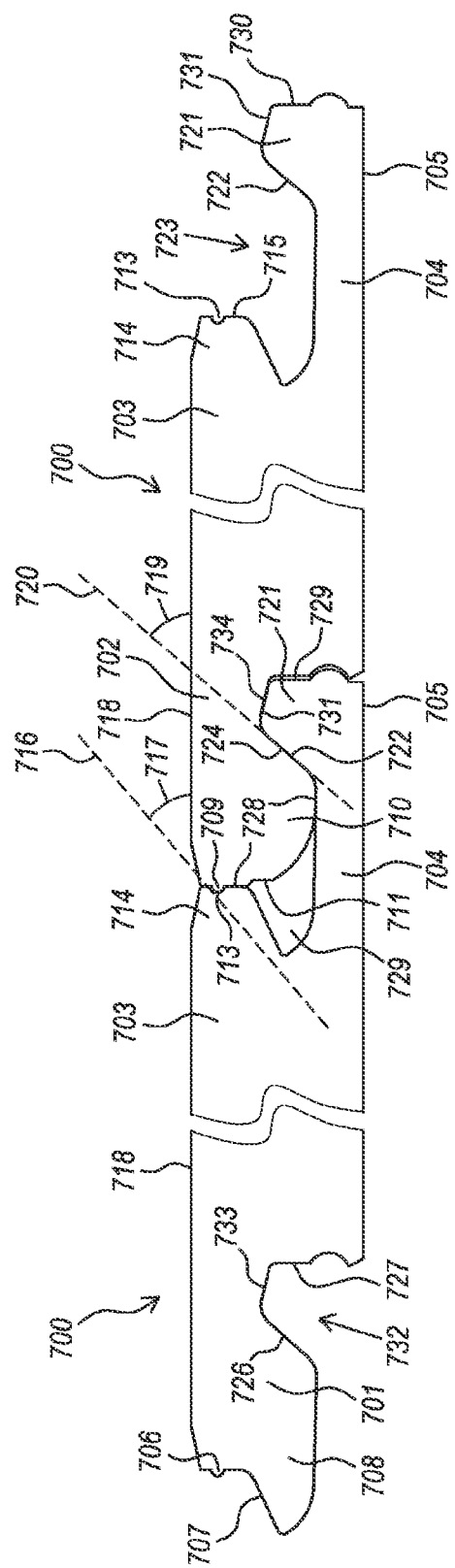

FIGS. 7a-7c show a cross-section of two multi-purpose panels (700) with further alternative coupling profiles (701,

702, 703) in a first, second and third coupled condition respectively. In this embodiment of the third coupling profile (703), no recess is present at the lower side (705) of the lower lip (704) thereof. In the depicted multi-purpose panels (700), the first coupling profile (701) moreover comprises another first locking element (706), provided at a distal side (707) of the first coupling profile (701), being located above at least a part of the sideward tongue (708). In addition, the second coupling profile (702) comprises another second locking element (709), provided at a distal side (711) of the downward tongue (710) facing away from the second downward recess (712). The third coupling profile (703) also comprises another, third, locking element (713), provided at a side (715) of the upper lip (714). In the coupled conditions shown in FIGS. 7a and 7b, the additional third locking element (713) faces the distal side (707) of the first coupling profile (701) of the adjacent panel (700), while in the coupled condition shown in FIG. 7c, the additional third locking element (713) faces the distal side (711) of the downward tongue (710) of the second coupling profile (702) of an adjacent panel (700). Further depicted in FIGS. 7a-7c is the co-action between the additional first or second locking element (706, 709) and the additional third locking element (713) for creating a vertical locking effect in coupled condition of two panels (700), defines a tangent T1 (716) which encloses an angle A1 (717) with a plane (718) defined by the panel (700), which angle A1 (717) is smaller than an angle A2 (719) enclosed by said plane (718) defined by the panel (700) and a tangent T2 (720) defined by a co-action between an inclined part of a proximal side (722) of the upward locking element (721) facing toward the third recess (723) and an inclined part of a proximal side (724) of the downward tongue (710) facing toward the second downward flank (725) respectively an inclined part of a proximal side (726) of the sideward tongue (708) facing toward the first downward flank (727).

In the embodiments of the coupling profiles (701, 702, 703) shown in FIGS. 7a-7c, the first coupling profile (701) and the third coupling profile (703) respectively the second coupling (702) and the third coupling profile (703) are configured such that in coupled condition a plurality of distant contact zones (728) are present, wherein in between each pair of adjacent contact zones (728) a space (729) remains. Specifically, FIGS. 7a and 7b show that the first downward flank (727) of the first coupling profile (701) and a distal side (730) of the upward locking element (721) and the lower lip (704) of the third coupling profile (703), facing the first downward flank (727), are positioned at a distance from each other. Additionally, the upper side (731) of the upward locking element (721) of the third coupling profile (703) is positioned at a distance from the upper side (733) of the first downward recess (732) of the first coupling profile (701). In FIG. 7c one can see that the second downward flank (725) of the second coupling profile (702) and a distal side (730) of the upward locking element (721) and the lower lip (704) of the third coupling profile (703), facing the second downward flank (725), are positioned at a distance from each other. In addition, the upper side (731) of the upward locking element (721) of the third coupling profile (703) is positioned at a distance from the upper side (734) of the second downward recess (712) of the second coupling profile (702).

The invention claimed is:

1. A decorative panel, comprising:
    a core provided with an upper side and a lower side,
    a decorative top structure affixed on said upper side of the core,
    a first panel edge comprising a first coupling profile, and a second panel edge comprising a second coupling profile being designed to engage interlockingly with said first coupling profile of an adjacent panel by a fold-down movement and/or a vertical movement,
    wherein said core comprises:
        at least one composite layer comprising:
            at least one magnesia based cement,
            at least one of the following: citric acid, phosphoric acid, phosphate, or any combination thereof,
            particles dispersed in said at least one magnesia based cement, and
            at least one reinforcement layer embedded in said at least one composite layer,
            wherein the at least one magnesia based cement comprises at least one of the following: $5Mg(OH)_2 \cdot MgSO_4 \cdot 5H_2O$ (515-phase), $Mg(OH)_2 \cdot MgSO_4 \cdot 7H_2O$ (517-phase), or any combination thereof,
    wherein the first coupling profile comprises:
        an upward tongue,
        at least one upward flank lying at a distance from the upward tongue,
        an upward groove formed in between the upward tongue and the upward flank wherein the upward groove is adapted to receive at least a part of a downward tongue of a second coupling profile of an adjacent panel, and
        at least one first locking element, and
    wherein the second coupling profile comprises:
        a first downward tongue,
        at least one first downward flank lying at a distance from the downward tongue,
        a first downward groove formed in between the downward tongue and the downward flank, wherein the downward groove is adapted to receive at least a part of an upward tongue of a first coupling profile of an adjacent panel, and
        at least one second locking element adapted for co-action with a first locking element of an adjacent panel.

2. The panel according to claim 1, wherein the at least one magnesia based cement comprises magnesium oxide and/or magnesium hydroxide.

3. The panel according to claim 1, wherein the at least one composite layer comprises at least one additional filler selected from the group consisting of: steel, glass, polypropylene, acrylic, alumina, curaua, carbon, coconut, kevlar, nylon, perlon, polyethylene, PVA, rock wool, sisal, and fique.

4. The panel according to claim 1, wherein the at least one composite layer comprises sodium carboxymethyl cellulose.

5. The panel according to claim 1, wherein the at least one composite layer comprises fly ash.

6. The panel according to claim 1, wherein the at least one composite layer comprises silica fume.

7. The panel according to claim 1, wherein the at least one composite layer comprises at least one polymer.

8. The panel according to claim 7, wherein the at least one polymer comprises PVC or PUR.

9. The panel according to claim 1, wherein the at least one composite layer comprises at least 50% by weight of the at least one magnesia based cement.

10. The panel according to claim 9, wherein the at least one composite layer comprises in between 50 and 90% by weight of the at least one magnesia based cement.

11. The panel according to claim 1, wherein the at least one composite layer comprises in between 1 and 15% by weight of cellulose based fibers.

12. The panel according to claim 1, wherein the at least one composite layer comprises in between 0 and 3% by weight of perlite.

13. The panel according to claim 1, wherein the at least one composite layer comprises in between 1 and 8% by weight of reinforcement layer.

14. The panel according to claim 1, wherein the at least one composite layer comprises a plurality of reinforcement layers.

15. The panel according to claim 14, wherein at least one first reinforcement layer is located in a top portion of the composite layer, and wherein at least one second reinforcement layer is located in a bottom portion of the composite layer.

16. The panel according to claim 1, further comprising recycled material.

17. The panel according to claim 1, further comprising at least one third coupling profile and at least one fourth coupling profile located respectively at a third panel edge and a fourth panel edge,
wherein the third coupling profile comprises:
a sideward tongue extending in a direction substantially parallel to the upper side of the core,
at least one second downward flank lying at a distance from the sideward tongue, and
a second downward groove formed between the sideward tongue and the second downward flank,
wherein the fourth coupling profile comprises:
a third groove configured for accommodating at least a part of the sideward tongue of the third coupling profile of an adjacent panel, said third groove being defined by an upper lip and a lower lip, wherein said lower lip is provided with an upward locking element,
wherein the third coupling profile and the fourth coupling profile are configured such that two of such panels can be coupled to each other by means of a turning movement, wherein, in coupled condition: at least a part of the sideward tongue of a first panel is inserted into the third groove of an adjacent, second panel, and wherein at least a part of the upward locking element of said second panel is inserted into the second downward groove of said first panel.

18. The panel according to claim 1, wherein the at least one magnesia based cement comprises magnesium oxide and clay.

19. The panel according to claim 1, wherein the at least one first locking element is provided at a distal side of the upward tongue facing away from the upward flank and the at least one second locking element is provided at the downward flank.

20. A decorative covering, comprising a plurality of mutually coupled decorative panels according to claim 1.

* * * * *